(12) United States Patent
Pan et al.

(10) Patent No.: US 11,758,590 B2
(45) Date of Patent: Sep. 12, 2023

(54) METHOD AND APPARATUS FOR REPORTING UE (USER EQUIPMENT) CAPABILITY INFORMATION FOR SLRB (SIDELINK RADIO BEARER) CONFIGURATION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 16/870,420

(22) Filed: May 8, 2020

(65) Prior Publication Data

US 2020/0359428 A1 Nov. 12, 2020

Related U.S. Application Data

(60) Provisional application No. 62/955,003, filed on Dec. 30, 2019, provisional application No. 62/846,412, filed on May 10, 2019.

(51) Int. Cl.
*H04L 12/00* (2006.01)
*H04W 76/10* (2018.01)
*H04W 28/02* (2009.01)

(52) U.S. Cl.
CPC ....... *H04W 76/10* (2018.02); *H04W 28/0268* (2013.01)

(58) Field of Classification Search
None
See application file for complete search history.

(56) References Cited

U.S. PATENT DOCUMENTS

| 2017/0181206 A1* | 6/2017 | Lee | H04W 28/06 |
| 2018/0092067 A1* | 3/2018 | Liu | H04W 72/048 |
| 2019/0239112 A1* | 8/2019 | Rao | H04W 4/70 |
| 2019/0320475 A1* | 10/2019 | Li | H04W 74/02 |

(Continued)

FOREIGN PATENT DOCUMENTS

EP 2966825 A1 * 1/2016 ............ H04W 84/18

OTHER PUBLICATIONS

European Search Report in corresponding EP Application No. 20173609.7, dated Aug. 27, 2020.

(Continued)

*Primary Examiner* — Noel R Beharry
*Assistant Examiner* — Lionel Preval
(74) *Attorney, Agent, or Firm* — Cooper Legal Group LLC

(57) ABSTRACT

A method and apparatus are disclosed from the perspective of a first UE (User Equipment) to report UE sidelink capability information to a network node. In one embodiment, the method includes the first UE establishing a unicast link with a second UE. The method also includes the first UE receiving a second sidelink capability information of the second UE from the second UE. The method further includes the first UE transmitting a first sidelink capability information of the first UE and the second sidelink capability information to the network node or transmitting a common sidelink capability information to the network node, wherein the common sidelink capability information is derived from the first sidelink capability information and the second sidelink capability information.

19 Claims, 20 Drawing Sheets

(56) References Cited

U.S. PATENT DOCUMENTS

| | | | |
|---|---|---|---|
| 2020/0146094 A1* | 5/2020 | Wu | H04W 4/40 |
| 2020/0229007 A1* | 7/2020 | Jung | H04W 24/04 |
| 2020/0314612 A1* | 10/2020 | Kang | H04W 4/40 |
| 2020/0322774 A1* | 10/2020 | Vargas | H04W 4/029 |
| 2020/0404532 A1* | 12/2020 | Kang | H04W 4/40 |
| 2021/0219105 A1* | 7/2021 | Fan | H04W 4/40 |
| 2022/0022168 A1* | 1/2022 | Wang | H04W 72/0406 |

OTHER PUBLICATIONS

3rd Generation Partnership Project; Technical Specification Group Radio Access Network, NR, Study on NR Vehicle-to-Everything, 3GPP TR 38.885 V16.0.0, Mar. 2019.

Notice of Submission of Opinion from Korean Intellectual Property Office in corresponding KR Application No. 10-2020-0055097, dated Apr. 29, 2021.

3GPP TR 38.885 v16.0.0 (Mar. 2019), 3rd Generation Partnership Project; Technical Specification Group Radio Access Network; NR; Study on NR Vehicle-to-Everything (V2X), (Release 16).

Office Action from Taiwan Intellectual Property Office in corresponding TW Application No. 109115471, dated Jan. 29, 2021.

3GPP, "Technical Report 3rd Generation Partnership Project; Technical Specification Group Radio Access Network NR; Study on NR Vehicle-to-Everything (V2X) (Release 16)", 3GPP TR 38.885 V16. 0.0. (Mar. 2019) Mar. 28, 2019.

Intel Corporation, "UE capability information exchange for NR sidelink", 3GPP TSG-RAN WG2 Meeting 105bis, R2-1903656, Apr. 8-12, 2019.

Corresponding Japanese Patent Application No. 2020-082405, Office Action dated Aug. 3, 2021. English Translation.

Catt, "Support of unicast, groupcast and broadcast in NR sidelink", 3GPP TSG RAN1 Meeting #94, R1-1808399, Agenda Item 7.2.4. 1.1, Document for Discussion and Decision, Aug. 210-24, 2018, Gothenburg, Sweden. Entire Document.

Oppo, "Discussion on network involvement in unicast link establishment", 3GPP TSG-RAN WG2 Meeting #106, R2-1905580, Agenda Item 11.4.5, Document for Discussion, Decision, May 13-17, 2019, Reno, US. Entire Document.

Corresponding Korean Patent Application No. 10-2020-0120078, Office Action dated Nov. 26, 2021. English Translation.

* cited by examiner

METHOD AND APPARATUS FOR REPORTING UE (USER EQUIPMENT) CAPABILITY INFORMATION FOR SLRB (SIDELINK RADIO BEARER) CONFIGURATION IN A WIRELESS COMMUNICATION SYSTEM

CROSS-REFERENCE TO RELATED APPLICATIONS

The present Application claims the benefit of U.S. Provisional Patent Application Ser. No. 62/846,412 filed on May 10, 2019 and U.S. Provisional Patent Application Ser. No. 62/955,003 filed on Dec. 30, 2019, the entire disclosures of which are incorporated herein in its entirety by reference.

FIELD

This disclosure generally relates to wireless communication networks, and more particularly, to a method and apparatus for reporting UE capability information for SLRB configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to report UE sidelink capability information to a network node. In one embodiment, the method includes the first UE establishing a unicast link with a second UE. The method also includes the first UE receiving a second sidelink capability information of the second UE from the second UE. The method further includes the first UE transmitting a first sidelink capability information of the first UE and the second sidelink capability information to the network node or transmitting a common sidelink capability information to the network node, wherein the common sidelink capability information is derived from the first sidelink capability information and the second sidelink capability information.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: 3GPP RAN2 #104 Chairman's Note; R2-1900370, "Summary of Email Discussion [104#58][NR V2X]—QoS support for NR V2X", Huawei; TS 36.300 V15.3.0, "Evolved Universal Terrestrial Radio Access (E-UTRA) and Evolved Universal Terrestrial Radio Access Network (E-UTRAN); Overall description"; TS 36.331 V15.3.0, "Evolved Universal Terrestrial Radio Access (E-UTRA); Radio Resource Control (RRC); Protocol Specification"; 3GPP Summary of [105bis#32] PC5-RRC signalling, OPPO; 3GPP RAN2 #107 Chairman's Note; 3GPP [108#44][V2X] 38.331/36.331 running CRs-Part1 38.331 CR (Huawei); and 3GPP RAN2#108 Chairman's Note. The standards and documents listed above are hereby expressly incorporated by reference in their entirety.

Figure 1:
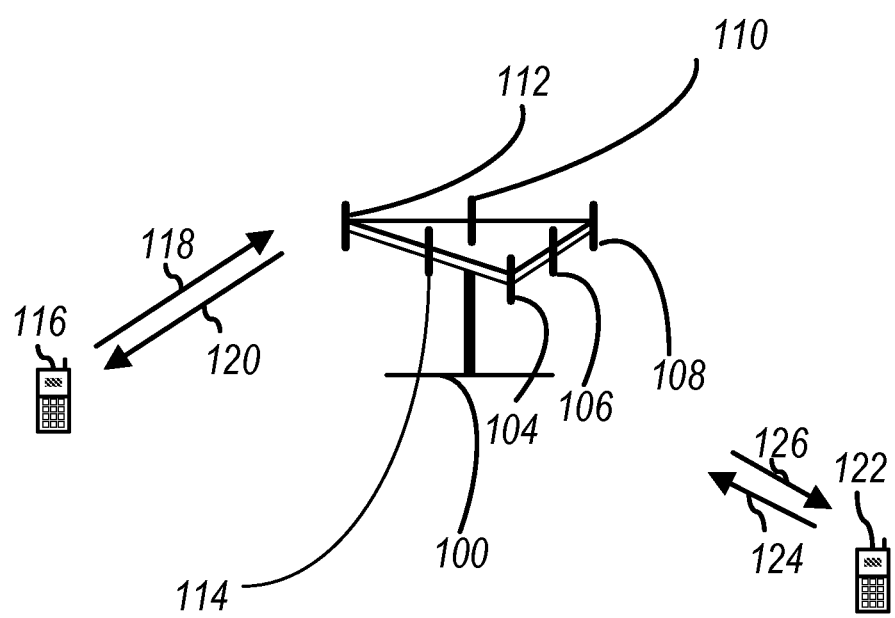
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
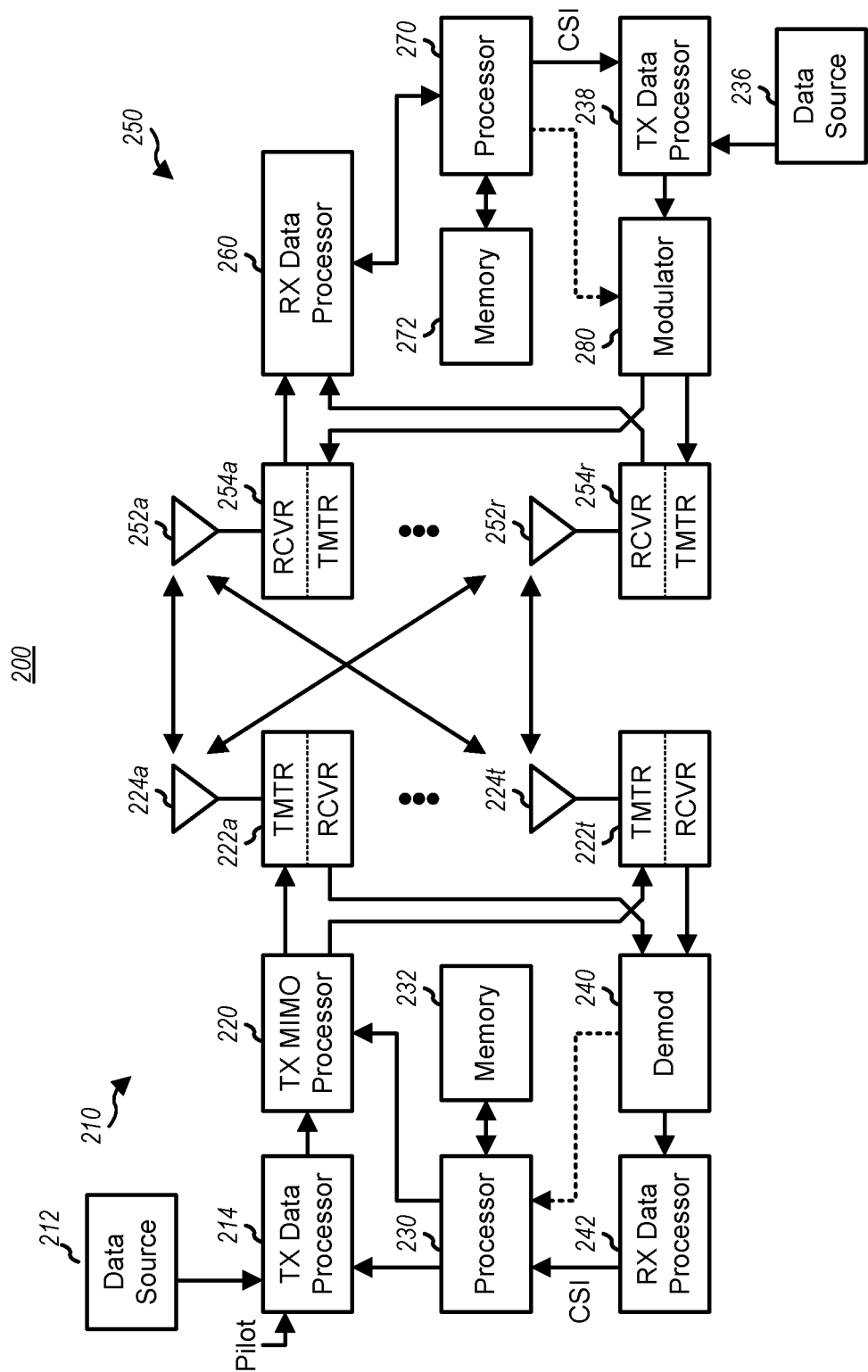
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
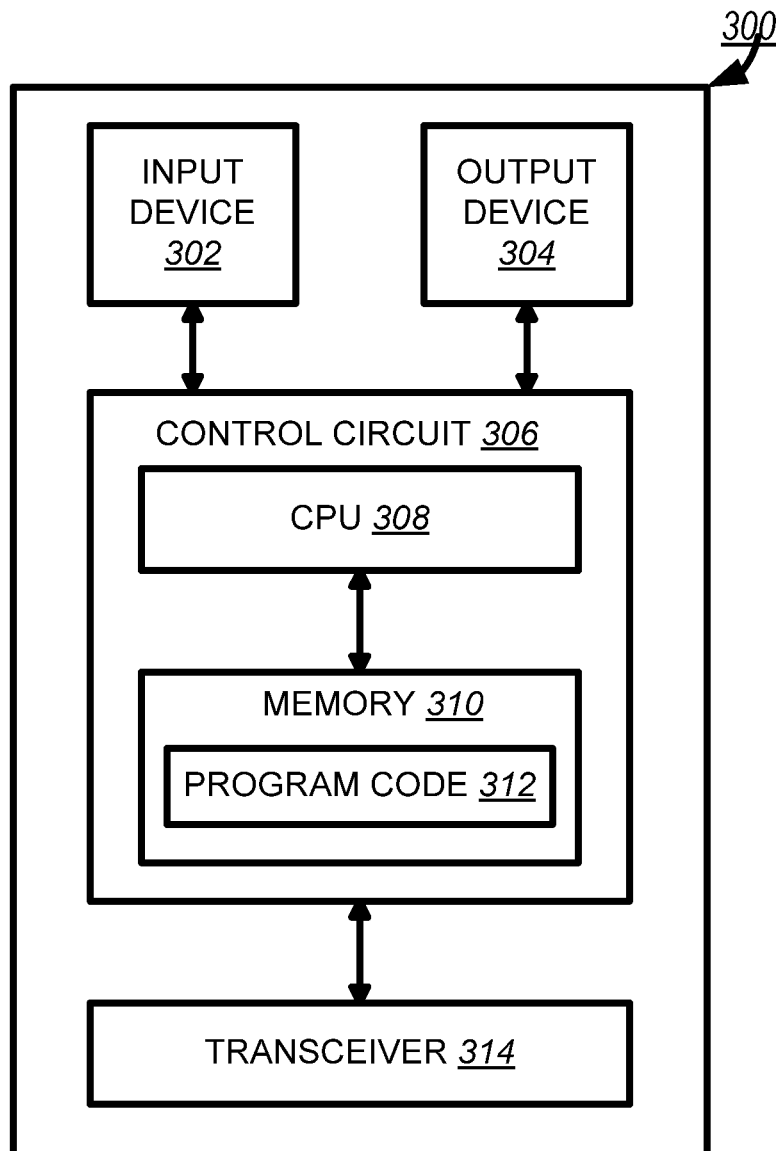
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
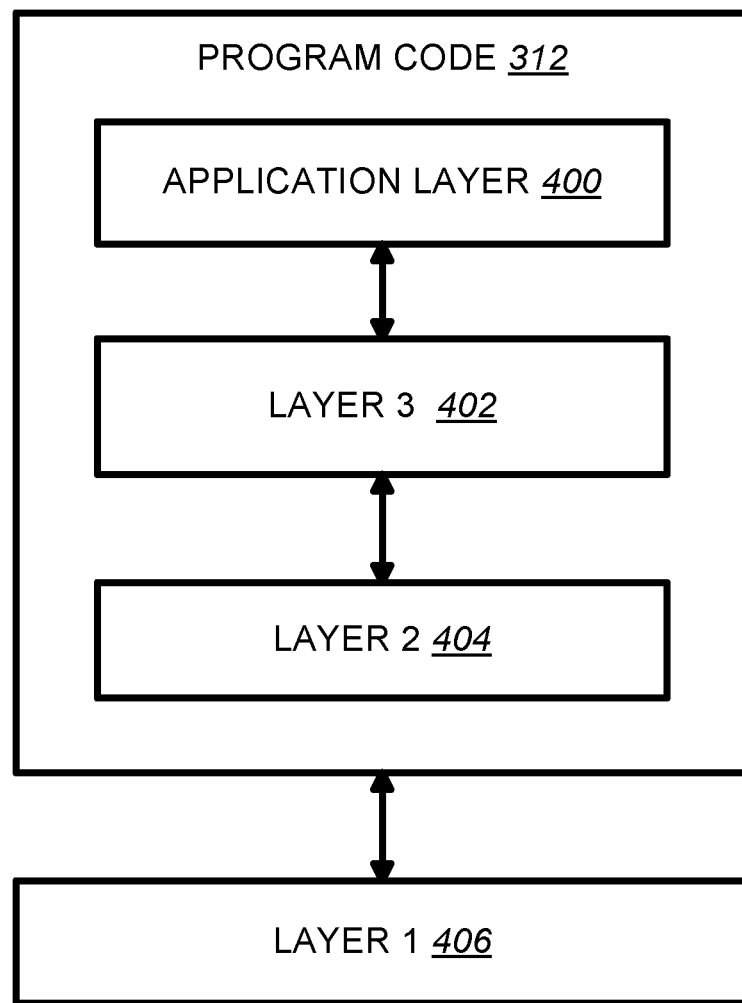
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The 3GPP RAN2#104 meeting made the following agreements on NR eV2X sidelink communications:

| Agreements on unicast |
|---|
| 1: For AS-level information required to exchange among UEs via sidelink for SL unicast, RAN2 can consider the followings as a baseline and will check if the AS-level information can be agreed and the details after some progress in RAN2, SA2 and RAN1:<br>UE ID, UE capability, Radio/Bearer configuration, PHY information/configuration (e.g. HARQ, CSI), Resource information/configuration and QoS info |
| 2: AS-level information for SL unicast can be exchanged between gNB and UE for RRC configuration. RAN2 assumes that a UE can provide network with QoS related information and will check if the AS-level information can be agreed and the details after some progress in RAN2, SA2 and RAN1. |
| 3: AS-level information is exchanged via RRC signalling (e.g. PC5-RRC) among UEs via sidelink for SL unicast. New logical channel (SCCH: SL Control Channel) in addition to STCH (SL Traffic Channel) will be also introduced. SCCH carriers PC5-RRC messages. |
| 4: RAN2 will consider both options during SI phase. Further discussion on the definition, procedure and information for each option is needed.<br>Option 1: AS layer connection establishment procedure by PC5-RRC is also needed.<br>Option 2: Upper layer connection establishment procedure is enough. |
| 5: RAN2 will study a kind of RRM or RLM based AS level link management. RAN2 will not consider a kind of PC5-RRC level keep alive message based management. Further discussion on possible detailed options is needed. |

A 3GPP email discussion [104#58][NR/V2X] discussed following:

In some contributions [11][12][13], it was pointed out that there might be the need for the receiver UE to be informed of some receiver-side relevant parameters corresponding to the SLRB(s) configured at the transmitter UE side, so as for the receiver to get aligned with the transmitter and correctly receive the data sent from corresponding SLRB(s). Such receiver-side related SLRB configurations may include sequence number space and RLC modes if they are configurable [13], and the reason is easy to understand: if these parameters are configurable, when a UE receives the data corresponding to an LCID, the UE has to be informed of the specific values set for these parameters by the transmitter on the corresponding SL LCH (and corresponding SLRB), in order to process the reception of the data correctly.

However, there were also some other reasonable views which indicate that similar to UE reception in DL there may be no QoS enforcement operation needed at the receiver in SL [11], or which treated such enforcement of receiver-side SLRB configurations by the transmitter as some forms of optimization [12]

In the following, therefore, it is worth discussing whether such receiver-side related SLRB configuration(s) informed to the receiver UE by the transmitter UE in NR SL is needed or not. Also, in LTE SL these receiver-side SLRB configurations are specified in STCH configuration in TS 36.331 [17, 9.1.1.6]), so that they do not need to be informed by the transmitter.

Question 5: Does the transmitter UE need to inform the receiver UE of any receiver-side related SLRB configurations in NR SL (so as to align transmitter and receiver on these configurations)? If yes, what are they?

a) Yes, the SN length used for reception of an SLRB needs to be informed (if configurable).

b) Yes, the RLC mode used for an SLRB needs to be informed (if configurable).

c) No. No such receiver-side SLRB configuration informed by the transmitter in NR SL is needed; they are specified configuration in the spec as in LTE SL.

d) Others. If selected, please clarify what other options are.

e) Yes, the PC5 QoS profile associated with each SLRB/SL LCH established at the transmitter UE needs to be informed to the receiver UE.

f) Yes, SLRB-specific PHY configuration needs to be informed (e.g. HARQ/SFCI configuration)

g) Yes, receiver-side SLRB configuration configured by transmitter UE (e.g. t-Reordering, t-Reassembly, etc)

The appendix in 3GPP R2-1900370 described several candidate options for NW configured/pre-configured SLRB as follows:

Appendix: Candidate Options for NW Configured/Pre-Configured SLRB

As per experience from LTE SL, UEs with different RRC states/resource allocation modes may depend on different ways of signaling and procedures for their SL (pre-)configuration (i.e. dedicated signaling, system information and pre-configuration). Therefore, options with different signaling flows are given below.

Option 1

Figure 5:
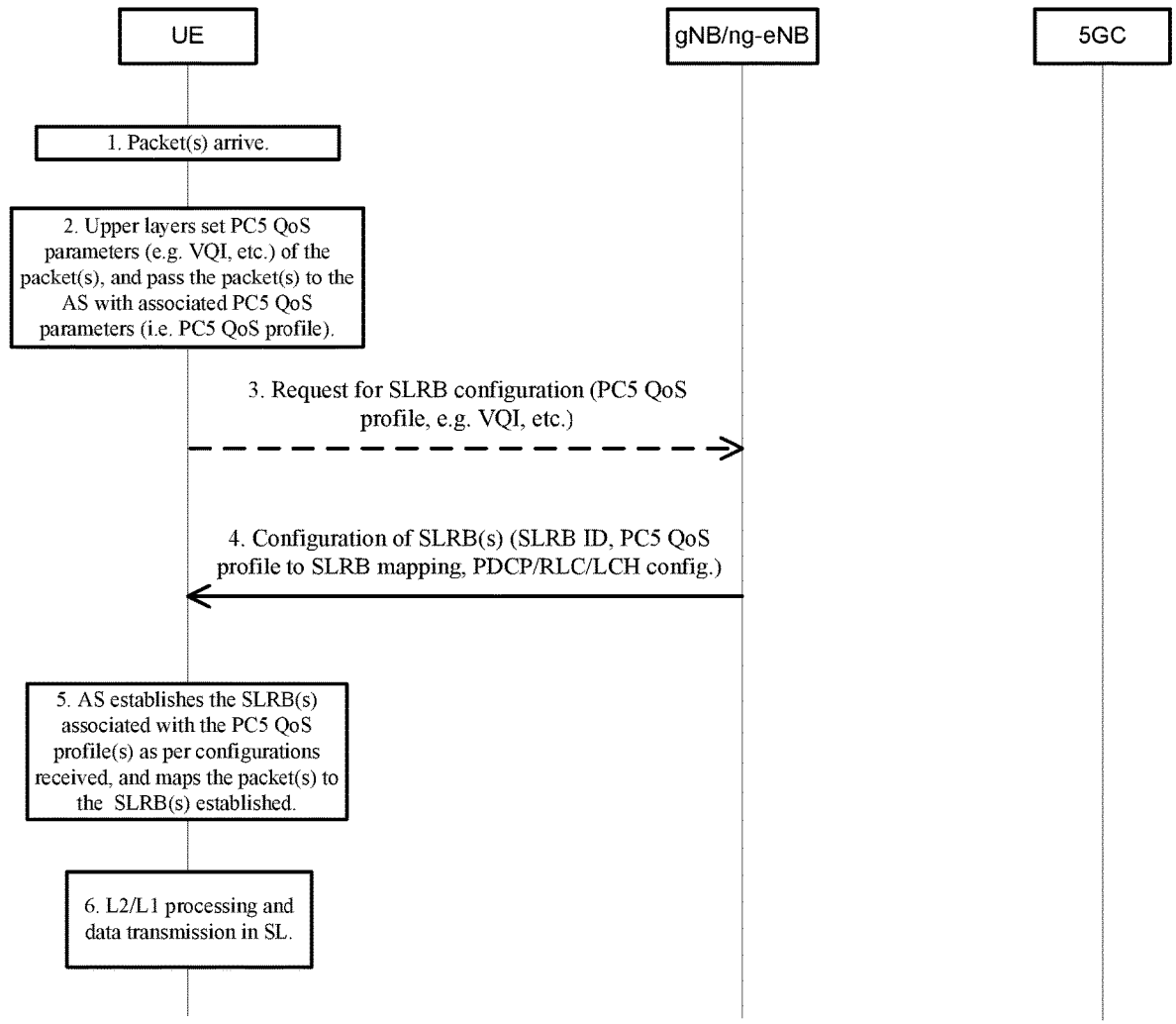
FIG. 5 is a reproduction of FIG. A-1 of 3GPP R2-1900370.

[FIG. A-1 of 3GPP R2-1900370, entitled "PC5 QoS profile based, UE specific configuration", is reproduced as FIG. 5]

Since SA5 concluded to define VQI to represent the per-packet PC5 QoS parameters in TR 23.786 and indicates that the VQI of each V2X message (whenever applicable) is set by application layer [1], this option is based on such conclusions and further assumes that the PC5 QoS parameters (e.g. VQI, etc.[1]), namely PC5 QoS profiles[2], tagged on each V2X packet is also submitted to the AS (similar to legacy PPPP/PPPR) as in Step 2 above. In Step 3, the UE may report the PC5 QoS profiles of the packet(s) to the gNB/ng-eNB, and requests the configuration of the SLRB(s) associated with these PC5 QoS profile(s) reported. As a response, the gNB/ng-eNB may signal the configurations of the SLRB(s) associated with the PC5 QoS profile(s) reported; these SLRB configurations may include SLRB ID, PC5 QoS profile to SLRB mapping, SDAP/PDCP/RLC/LCH configurations, etc. In Step 5, the UE in the AS establishes SLRB(s) associated with the QoS profile of the packet(s) as per gNB/nb-eNB configuration, and maps the packet(s) to the SLRB(s) established. Afterward, SL transmission happens.

[1] Here, the specific PC5 QoS parameters in the figure include VQI and other potential QoS parameters identified by Q2, so that the "etc." placed here might be updated as per Q2 conclusion later (if the option itself is finally supported). This applies also to Option 3 & 4 below

[2] Similar to Uu, the term "PC5 QoS profile" here means a set of PC5 QoS parameters, i.e. VQI and other potential QoS parameters from Q2.

Since SA2 assume that "non-standardized VQI is not supported in this release" in TR 23.786 [1], it is quite likely that, similar to 5QI used in NR Uu, the PC5 QoS parameters of each VQI are also standardized in the specification. Also, if VQI itself is regarded as not sufficient to reflect all PC5 QoS parameters in Q2, other necessary QoS parameters will be used together with VQI to form the PC5 QoS profile and reported to the RAN as well. Therefore, this option is characterized by enabling the UE to directly "tell" the QoS parameters of available packets in RAN to the gNB/ng-eNB which thus no longer needs to rely on CN to get aware of the QoS profiles of the UE's traffic as in Uu.

Applicability: In this option, the gNB/ng-eNB configures SLRB depending on the PC5 QoS parameters of the actually packets available as reported by the UE, so it works in a UE-specific manner and is applied to RRC_CONNECTED UEs.

Option 2

Figure 6:
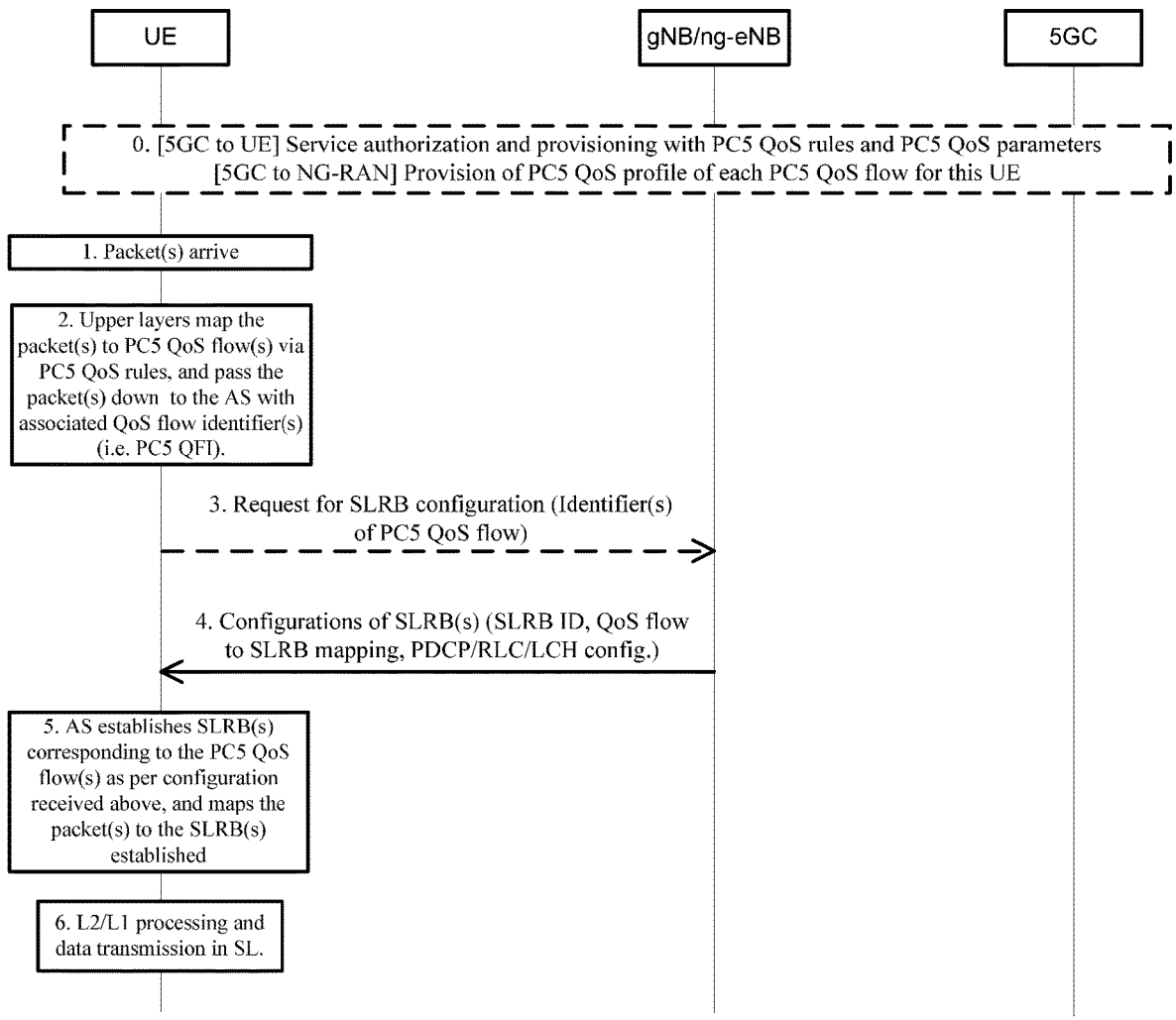
FIG. 6 is a reproduction of FIG. A-2 of 3GPP R2-1900370.

[FIG. A-2 of 3GPP R2-1900370, entitled "PC5 QoS flow based, UE specific configuration", is reproduced as FIG. 6]

Option 2, as shown in FIG. A-2, is to imitate the QoS flow based mechanism in NR Uu, because, as per Solution #19 in TR 23.786 [1], SA2 is also proposing, at least for QoS support SL unicast, to use the PC5 QoS flow based mechanism as follows [1]:

arrive, the UE can first derive the identifier of the associated PC5 QoS flow(s) based on the PC5 QoS rules configured in Step 0, and may then report these PC5 QFI(s) to the gNB/ng-eNB in Step 3. At the gNB/ng-eNB side, it can derive the QoS profile(s) of these reported PC5 QFI(s) based on the provisioning from 5GC in Step 0, and thus may signal the configurations of the SLRB(s) associated with the PC5 QFI(s) UE reported. In Step 5, the UE in the AS establishes SLRB(s) associated with the PC5 QFI(s) of the packet(s) as per gNB/ng-eNB configuration, and maps available packet(s) to the SLRB(s) established.

The biggest difference from Option 1 is that, with only QFI used as in NR Uu, the specific QoS parameters of each QoS flow may not be directly visible in the AS of the UE/RAN, so that the gNB/ng-eNB still needs to depend on the configuration from CN to know the specific QoS profile as in Uu (though the QoS profiles are provided in a provisioning way in advance)

Applicability: This option, similar to Option 1, is only applicable to RRC_CONNECTED UEs.

3GPP TS 36.331 introduced following:

5.6.10 UE Assistance Information 5.6.10.1 General

Figure 7:
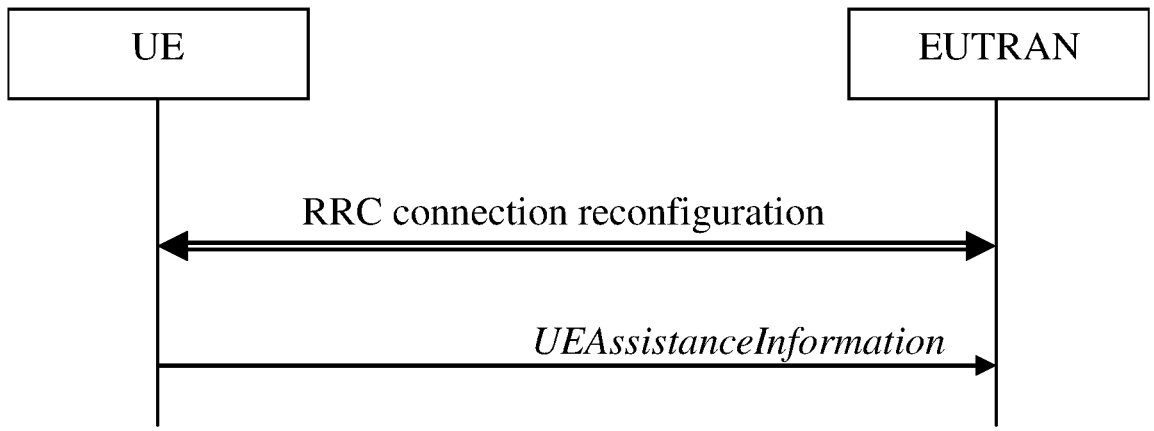
FIG. 7 is a reproduction of FIG. 5.6.10.1-1 of 3GPP TS 36.331 V15.3.0.

[FIG. 5.6.10.1-1 of 3GPP TS 36.331 V15.3.0, entitled "UE Assistance Information", is reproduced as FIG. 7]

The purpose of this procedure is to inform E-UTRAN of the UE's power saving preference and SPS assistance information, maximum PDSCH/PUSCH bandwidth configuration preference, overheating assistance information, or the UE's delay budget report carrying desired increment/decrement in the Uu air interface delay or connected mode DRX cycle length and for BL UEs or UEs in CE of the RLM event ("early-out-of-sync" or "early-in-sync") and RLM information. Upon configuring the UE to provide power preference indications E-UTRAN may consider that the UE does not prefer a configuration primarily optimised for power saving until the UE explicitly indicates otherwise.

5.6.10.2 Initiation

A UE capable of providing power preference indications in RRC_CONNECTED may initiate the procedure in several cases including upon being configured to provide power preference indications and upon change of power preference. A UE capable of providing SPS assistance information in RRC_CONNECTED may initiate the procedure in several cases including upon being configured to provide SPS assistance information and upon change of SPS assistance information.

| 6.19.2.1.1 QoS parameters provision to UE and NG-RAN |
|---|
| The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDs of the V2X application) to the PC5 QoS flow. The PC5 QoS parameters are provisioned to the NG-RAN as part of The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2. |

Particularly, in Step 0 the PC5 QoS parameters and PC5 QoS rules for each PC5 QoS flow are provisioned to the UE in advance by service authorization and provisioning procedure as above SA2 conclusions; similarly, PC5 QoS profiles for each QoS flows are also given to the eNB/ng-eNB in advance in a provisioning way. Then, when packet(s)

A UE capable of providing delay budget report in RRC_CONNECTED may initiate the procedure in several cases, including upon being configured to provide delay budget report and upon change of delay budget preference.

A UE capable of CE mode and providing maximum PDSCH/PUSCH bandwidth preference in RRC_CON- NECTED may initiate the procedure upon being configured to provide maximum PDSCH/PUSCH bandwidth preference and/or upon change of maximum PDSCH/PUSCH bandwidth preference.

A UE capable of providing overheating assistance information in RRC_CONNECTED may initiate the procedure if it was configured to do so, upon detecting internal overheating, or upon detecting that it is no longer experiencing an overheating condition.

Figure 8:
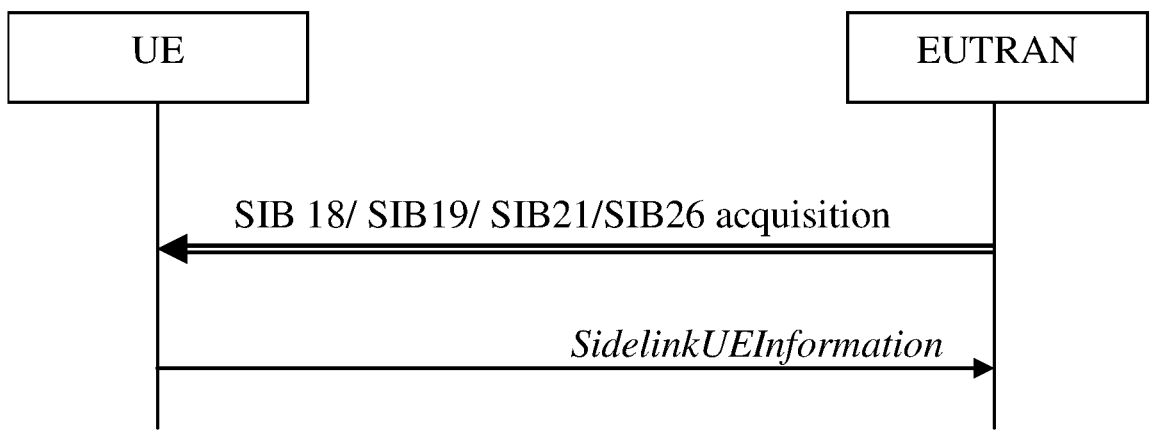
FIG. 8 is a reproduction of FIG. 5.10.2-1 of 3GPP TS 36.331 V15.3.0.

Upon initiating the procedure, the UE shall:
[ . . . ]
1> if configured to provide SPS assistance information:
    2> if the UE did not transmit a UEAssistanceInformation message with sps-AssistanceInformation since it was configured to provide SPS assistance information; or
    2> if the current SPS assistance information is different from the one indicated in the last transmission of the UEAssistanceInformation message:
        3> initiate transmission of the UEAssistanceInformation message in accordance with 5.6.10.3;

5.6.10.3 Actions Related to Transmission of UEAssistanceInformation Message
[ . . . ]
The UE shall set the contents of the UEAssistanceInformation message for SPS assistance information:
1> if configured to provide SPS assistance information:
    2> if there is any traffic for V2X sidelink communication which needs to report SPS assistance information:
        3> include trafficPatternInfoListSL in the UEAssistanceInformation message;
    2> if there is any traffic for uplink communication which needs to report SPS assistance information:
        3> include trafficPatternInfoListUL in the UEAssistanceInformation message;

5.10.2 Sidelink UE Information
5.10.2.1 General
[FIG. 5.10.2-1 of 3GPP TS 36.331 V15.3.0, entitled "Sidelink UE information", is reproduced as FIG. 8]

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation
A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18 SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

Upon initiating the procedure, the UE shall:
[ . . . ]
1> if SystemInformationBlockType21 including sl-V2X-ConfigCommon is broadcast by the PCell:
    2> ensure having a valid version of SystemInformationBlockType21 and SystemInformationBlockType26, if broadcast, for the PCell;
    2> if configured by upper layers to receive V2X sidelink communication on a primary frequency or on one or more frequencies included in v2x-InterFreqInfoList, if included in SystemInformationBlockType21 or SystemInformationBlockType26 of the PCell:
        3> if the UE did not transmit a SidelinkUEInformation message since last entering RRC_CONNECTED state; or
        3> if since the last time the UE transmitted a SidelinkUEInformation message the UE connected to a PCell not broadcasting SystemInformationBlockType21 including sl-V2X-ConfigCommon; or
        3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
            4> initiate transmission of the SidelinkUEInformation message to indicate the V2X sidelink communication reception frequency(ies) of interest in accordance with 5.10.2.3;
    2> else:
        3> if the last transmission of the SidelinkUEInformation message included v2x-CommRxInterestedFreqList:
            4> initiate transmission of the SidelinkUEInformation message to indicate it is no longer interested in V2X sidelink communication reception in accordance with 5.10.2.3;
    2> if configured by upper layers to transmit V2X sidelink communication on a primary frequency or on one or more frequencies included in v2x-InterFreqInfoList, if included in SystemInformationBlockType21 or SystemInformationBlockType26 of the PCell:
        3> if the UE did not transmit a SidelinkUEInformation message since last entering RRC_CONNECTED state; or
        3> if since the last time the UE transmitted a SidelinkUEInformation message the UE connected to a PCell not broadcasting SystemInformationBlockType21 including sl-V2X-Config-Common; or 3> if the last transmission of the SidelinkUEInformation message did not include v2x-CommTxResourceReq; or if the information carried by the v2x-CommTxResourceReq has changed since the last transmission of the SidelinkUEInformation message:

4> initiate transmission of the SidelinkUEInformation message to indicate the V2X sidelink communication transmission resources required by the UE in accordance with 5.10.2.3;

2> else:

3> if the last transmission of the SidelinkUEInformation message included v2x-CommTxResourceReq:

4> initiate transmission of the SidelinkUEInformation message to indicate it no longer requires V2X sidelink communication transmission resources in accordance with 5.10.2.3;

The 3GPP Summary of [105bis#32] PC5-RRC signalling introduced following:

2.2 Issue-2: AS-Layer Configuration

According to the conclusion from RAN2#105, there is just one option for AS-layer configuration.

Figure 9:
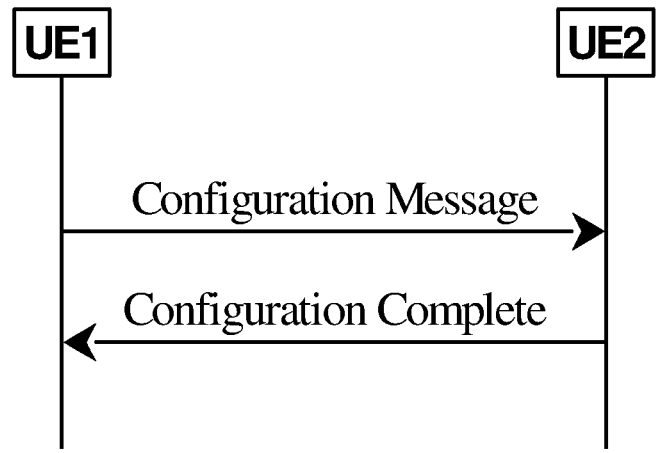
FIG. 9 is a reproduction of FIG. 1 of 3GPP Summary of [105bis#32] PC5-RRC signalling.

[FIG. 5 of 3GPP Summary of [105bis#32] PC5-RRC signalling, entitled "SL AS layer configuration information flow, successful", is reproduced as FIG. 9]

The first issue is the necessity of a failure case, if see the above case as a successful case (The annotation in the figures are just for illustration, but not to conclude on the naming of the procedure).

Figure 10:
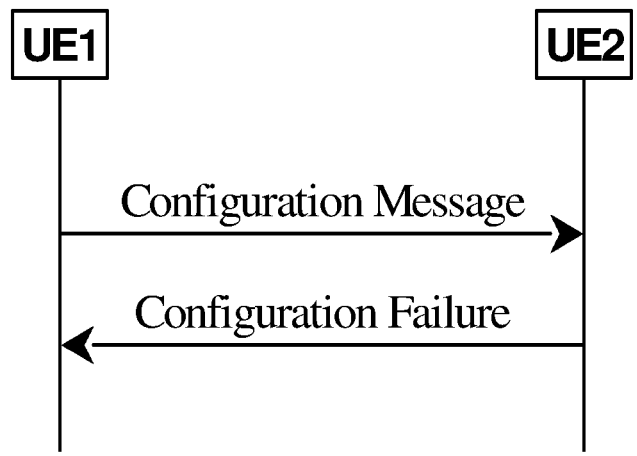
FIG. 10 is a reproduction of FIG. 2 of 3GPP Summary of [105bis#32] PC5-RRC signalling.

[FIG. 6 of 3GPP Summary of [105bis#32] PC5-RRC signalling, entitled "SL AS layer configuration information flow, failure", is reproduced as FIG. 10]

The 3GPP RAN2#107 meeting made the following agreements on NR sidelink communications, as stated in the 3GPP RAN2#107 Chairman's note, as follows:

| Agreements on SLRB configuration: |  |
|---|---|
| 1-1: | For SL unicast, SLRB Identity is both Tx and Rx parameter. For SL broadcast and groupcast, FFS on its Tx/Rx attribute, i.e. Tx only or both Tx and Rx. |
| 1-2: | For dedicated SLRB configuration, destination identity is one of the SLRB parameters for configuration. It is applicable to SL broadcast, groupcast and unicast. FFS on its Tx/Rx attribute. |
| 1-3: | Cast type is considered as one of the SLRB parameters for common configuration via SIB/preconfiguration. It is applicable to SL broadcast, groupcast and unicast. FFS on its Tx/Rx attribute. |
| 2-1: | Default SLRB configuration is applicable for each cast type. |
| 2-2: | The mapped QoS flow(s) to SLRB is considered as one of the SLRB parameters for configuration. It is applicable to SL broadcast, groupcast and unicast. For unicast it is applicable to both Tx and Rx, for groupcast and broadcast, it is applicable to only TX. |
| 2-3: | Transmission range to SLRB mapping is considered as one of the SLRB parameters for configuration. |
| 3-1: | Discard timer is Tx only parameter and applicable to SL broadcast, groupcast and unicast. |
| 3-2: | PDCP SN Size is both Tx and Rx parameter and applicable to SL broadcast, groupcast and unicast. |
| 3-3: | MaxCID is both Tx and Rx parameter and applicable to SL broadcast, groupcast and unicast. |
| 3-4: | ROHC profile needs to be configured for TX UE. |
| 3-5: | T-reordering timer is Rx only parameter and applicable to SL broadcast, groupcast and unicast. |
| 3-6: | OutOfOrderDelivery is Rx only parameter and applicable to SL unicast. FFS on SL broadcast, groupcast. FFS on TX case. |
| 4-1: | RLC mode is both Tx and Rx parameter and applicable to SL unicast. |
| 4-2: | RLC SN field length is both Tx and Rx parameter and applicable to SL broadcast, groupcast and unicast. |
| 4-3: | T-Reassembly timer is Rx only parameter and applicable to SL broadcast, groupcast and unicast. |
| 4-4: | T-PollRetransmit timer is Tx only parameter and applicable to SL unicast. |
| 4-5: | PollPDU is Tx only parameter and applicable to SL unicast. |
| 4-6: | PollByte is Tx only parameter and applicable to SL unicast. |
| 4-7: | MaxRetxThreshold is Tx only parameter and applicable to SL unicast. |
| 4-8: | T-StatusProhibit timer is Rx only parameter and applicable to SL unicast. |
| 5-1: | LogicalChannelIdentity is both TX and RX parameter and applicable to SL unicast. It is only TX parameter to SL broadcast and groupcast. |
| 5-2: | LogicalChannelGroup is Tx only parameter and applicable to SL broadcast, groupcast and unicast. |
| 5-3: | Priority is Tx only parameter and applicable to SL broadcast, groupcast and unicast. |
| 5-4: | PrioritizedBitRate is Tx only parameter and applicable to SL broadcast, groupcast and unicast. |
| 5-5: | BucketSizeDuration is Tx only parameter and applicable to SL broadcast, groupcast and unicast. |
| 5-6: | ConfiguredGrantType1Allowed is Tx only parameter and applicable to SL broadcast, groupcast and unicast. |
| 5-7: | SchedulingRequestID is Tx only parameter and applicable to SL broadcast, groupcast and unicast. |
| 5-8: | LogicalChannelSR-DelayTimerApplied is Tx only parameter and applicable to SL broadcast, groupcast and unicast. |

| Agreements on SLRB configuration: |
|---|
| 5-9: It is FFS whether any HARQ related information is considered as one of the SLRB parameters for configuration. |
| 6-1: For SL groupcast, it is up to UE implementation on how to set the Rx only SLRB parameters. |
| 6-2: For SL unicast, it is up to UE implementation on how to set the Rx only SLRB parameters. |
| 6-3: Separate SLRB configuration is considered for SL broadcast and groupcast. |

As stated in 3GPP [108#44][V2X] 38.331/36.331 Running CRs-Part 1 38.331 CR (Huawei), the 3GPP Running CR for NR SL introduced the following:

5.3.5 RRC Reconfiguration

[Unrelated Texts Omitted]

5.3.5.3 Reception of an RRCReconfiguration By the UE

The UE shall perform the following actions upon reception of the RRCReconfiguration:

[ . . . ]

1> if the RRCReconfiguration message includes the sl-ConfigDedicatedNR:
  2> perform the sidelink dedicated configuration procedure as specified in 5.3.5.X;
1> if the RRCReconfiguration message includes the sl-ConfigDedicatedEUTRA:
  2> if sl-V2X-ConfigDedicated is included in sl-ConfigDedicatedEUTRA
    3> perform the V2X sidelink communication dedicated configuration procedure as specified in 5.3.10.15a in TS 36.331 [10];
  2> if sl-V2X-SPS-Config is included in sl-ConfigDedicatedEUTRA
    3> perform V2X sidelink SPS reconfiguration as specified in 5.3.10.5 in TS 36.331 [10];
[ . . . ]

5.x.3.3 Actions Related to Transmission of SidelinkUEInformationNR Message

The UE shall set the contents of the SidelinkUEInformationNR message as follows:

1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
  2> if SIBX including sl-ConfigCommonNR is provided by the PCell:
    3> if configured by upper layers to receive NR sidelink communication:
      4> include sl-RxInterestedFreqList and set it to the frequency for NR sidelink communication reception;
    3> if configured by upper layers to transmit NR sidelink communication:
      4> include sl-TxResourceReqList and set its fields as follows for each destination for which it requests network to assign NR sidelink communication resource:
        5> set sl-DestinationIdentity to the destination identity configured by upper layer for NR sidelink communication transmission;
        5> set sl-CastType to the cast type of the associated destination identity configured by the upper layer for the NR sidelink communication transmission;
        5> set sl-RLC-ModeIndication to include the RLC mode(s) and optionally QoS profile(s) of the sidelink QoS flow(s) of the associated RLC mode(s), if the associated bi-directional sidelink DRB addition is due to the configuration by RRCReconfigurationSidelink;
        5> set sl-Failure for the associated destination for the NR sidelink communication transmission, if the sidelink RLF is detected;
        5> set sl-QoS-InfoList to include QoS profile(s) of the sidelink QoS flow(s) of the associated destination configured by the upper layer for the NR sidelink communication transmission;
        5> set sl-InterestedFreqList to indicate the frequency for NR sidelink communication transmission;
        5> set sl-TypeTxSyncList to the current synchronization reference type used on the associated sl-InterestedFreqList for NR sidelink communication transmission.
1> The UE shall submit the SidelinkUEInformationNR message to lower layers for transmission.
[ . . . ]

5.X.9.1 Sidelink RRC reconfiguration 5.x.9.1.1 General

Figure 11:
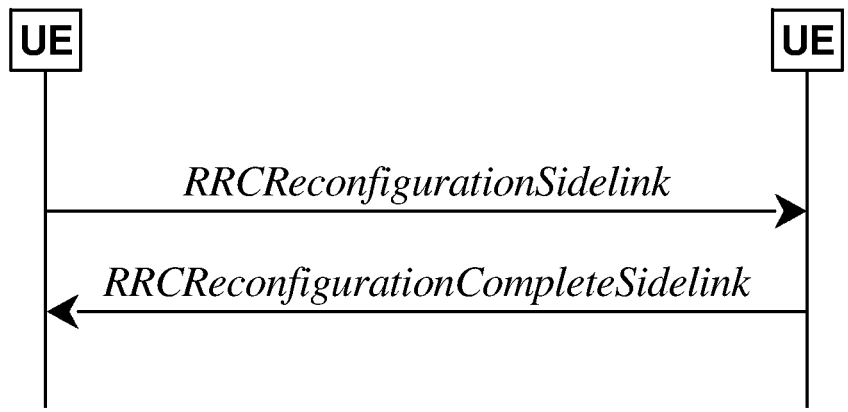
FIG. 11 is a reproduction of FIG. 5.x.9.1.1-1 of 3GPP [108 #rr][V2X] 38.331/36.331 Running CRs-Part 1 38.331 CR (Huawei).

[FIG. 5.x.9.1.1-1 of 3GPP [108#44][V2X] 38.331/36.331 Running CRs-Part 1 38.331 CR (Huawei), entitled "Sidelink RRC reconfiguration, successful", is reproduced as FIG. 11]

Figure 12:
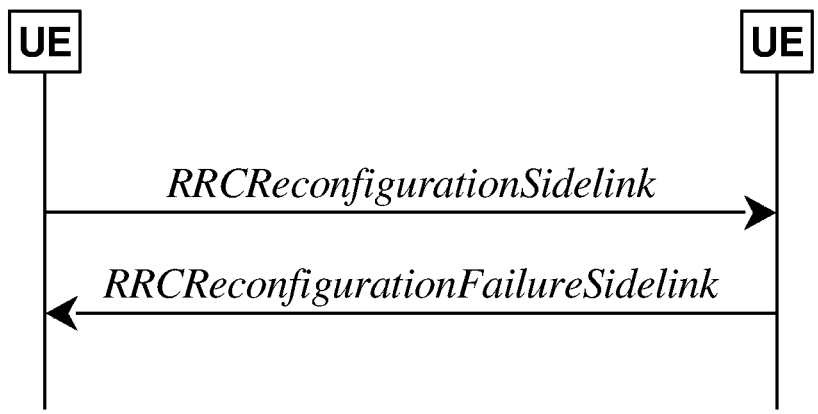
FIG. 12 is a reproduction of FIG. 5.x.9.1.1-2 of 3GPP [108#rr][V2X] 38.331/36.331 Running CRs-Part 1 38.331 CR (Huawei).

[FIG. 5.x.9.1.1-2 of 3GPP [108#44][V2X] 38.331/36.331 Running CRs-Part 1 38.331 CR (Huawei), entitled "Sidelink RRC reconfiguration, failure", is reproduced as FIG. 12]

The purpose of this procedure is to establish/modify/release sidelink DRBs or configure NR sidelink measurement and report for a PC5-RRC connection.

The UE may initiate the sidelink RRC reconfiguration procedure and perform the operation in sub-clause 5.x.9.1.2 to its peer UE in following cases:
  the release of sidelink DRBs associated with the peer UE, as specified in sub-clause 5.x.9.1.4;
  the establishment of sidelink DRBs associated with the peer UE, as specified in sub-clause 5.x.9.1.5;
  the modification for the parameters included in SLRB-Config of sidelink DRBs associated with the peer UE, as specified in sub-clause 5.x.9.1.5;
  the configuration of the peer UE to perform NR sidelink measurement and report.

5.x.9.1.2 Actions related to transmission of RRCReconfigurationSidelink Message

The UE shall set the contents of RRCReconfigurationSidelink message as follows:

1> for each sidelink DRB that is to be released, according to sub-clause 5.x.9.1.4.1, due to configuration by sl-ConfigDedicatedNR, SIBX, SidelinkPreconfigNR or by upper layers:

2> set the slrb-PC5-ConfigIndex included in the slrb-ConfigToReleaseList corresponding to the sidelink DRB;
1> for each sidelink DRB that is to be established or modified, according to sub-clause 5.x.9.1.5.1, due to receiving sl-ConfigDedicatedNR, SIBX, SidelinkPreconfigNR:
2> set the SLRB-Config included in the slrb-ConfigToAddModList, according to the received sl-RadioBearerConfig and sl-RLC-BearerConfig corresponding to the sidelink DRB;
1> for each NR sidelink measurement and report that is to be configured:
2> set the sl-MeasConfig according to the stored NR sidelink measurement configuration information;
1> start timer T400 for the destination associated with the sidelink DRB;
The UE shall submit the RRCReconfigurationSidelink message to lower layers for transmission.

2> continue using the configuration used prior to the reception of RRCReconfigurationFailureSidelink message;
2> set the content of the RRCReconfigurationFailureSidelink message;
3> submit the RRCReconfigurationFailureSidelink message to lower layers for transmission;
1> else:
2> set the content of the RRCReconfigurationCompleteSidelink message;
3> submit the RRCReconfigurationCompleteSidelink message to lower layers for transmission;
NOTE X: When the same logical channel is configured with different RLC mode by another UE, the UE handles the case as sidelink RRC reconfiguration failure.
[ . . . ]

As stated in the 3GPP RAN2#108 Chairman's note, the 3GPP RAN2#108 meeting made following agreements:

Agreements on failure case handling:

1: The SUI report upon SL RLF includes explicit failure indication.
2: Upon the PC5-RRC connection release, the UE performs the following actions: 1) Discard any associated SL UE context, if any; 2) Release all associated SLRBs configuration including release of the RLC entity and the associated PDCP entity and SDAP; and 3) Indicate the release of the PC5-RRC connection to upper layers (e.g. PC5-S entity) if PC5-RRC connection release is triggered by AS-layer. FFS on behaviour for MAC layer, security keys and relevant timers (if any).
3: If the UE is able to comply with the received configuration in AS-layer configuration message, it initiates PC5-RRC based AS-layer Configuration Complete. Otherwise, it initiates PC5-RRC based AS-layer configuration failure. FFS whether to follow proposal3 or not at PC5-RRC-based AS-layer configuration fails.

5.x.9.1.3 Reception of an RRCReconfigurationSidelink by the UE
The UE shall perform the following actions upon reception of the RRCReconfigurationSidelink:
1> if the RRCReconfigurationSidelink includes the slrb-ConfigToReleaseList:
2> for each sirb-PC5-ConfigIndex value included in the slrb-ConfigToReleaseList that is part of the current UE sidelink configuration;
3> perform the sidelink DRB release procedure, according to sub-clause 5.x.9.1.4;
1> if the RRCReconfigurationSidelink includes the sirb-ConfigToAddModList:
2> for each sirb-PC5-ConfigIndex value included in the sirb-ConfigToAddModList that is not part of the current UE sidelink configuration:
3> apply the sl-MappedQoS-FlowsToAddList and sl-MappedQoS-FlowsToReleaseList, if included;
3> perform the sidelink DRB addition procedure, according to sub-clause 5.x.9.1.5;
2> for each sirb-PC5-ConfigIndex value included in the sirb-ConfigToAddModList that is part of the current UE sidelink configuration:
3> apply the sl-MappedQoS-FlowsToAddList and sl-MappedQoS-FlowsToReleaseList, if included;
3> perform the sidelink DRB release or modification procedure, according to sub-clause 5.x.9.1.4 and 5.x.9.1.5.
1> if the UE is unable to comply with (part of) the configuration included in the RRCReconfigurationFailureSidelink (i.e. sidelink RRC reconfiguration failure):

In 3GPP R2-1900370, options for NW-configured SLRB (Sidelink Raodio Bearer) configuration and pre-configured SLRB configuration for PC5 QoS (Quality of Service) flow based and PC5 QoS profile based were introduced. The SLRB configuration may include SLRB ID(s), QoS flow-to-SLRB mapping, and AS (Access Stratum) configuration (e.g. PDCP (Packet Data Convergence Protocol)/RLC (Radio Link Control)/LCH (Logical Channel) configurations). The AS configuration could indicate e.g. t-Reordering, Reordering_Window, Maximum_PDCP_SN, RLC mode (UM or AM), AM_Window Size, UM_Window_Size, identity of sidelink logical channel and/or etc.

During an AS-layer configuration procedure, a failure case may occur if the NW-configured SLRB configuration provided by the gNB is not acceptable to the peer UE. Then, the issue is how to ensure gNB can configure a SLRB configuration acceptable to both UEs.

In NR Uu, the gNB determines a dedicated configuration for a UE according to capability of the UE. If NR SL follows NR Uu design, the gNB may need to know the sidelink capabilities of both UEs before the gNB provides a NW-configured SLRB configuration acceptable to both UEs. It is supposed that UE1 establishes a unicast link with UE2, and the UE1 is in RRC_CONNECTED. A potential solution is for the UE1 to report UE sidelink capability information of both UEs (UE1 and UE2) to its serving gNB so that the serving gNB can determine a SLRB configuration acceptable to both UEs. It is possible that the UE1 may report the UE sidelink capability information of both UEs to the gNB in one message or in separate messages.

Figure 13:
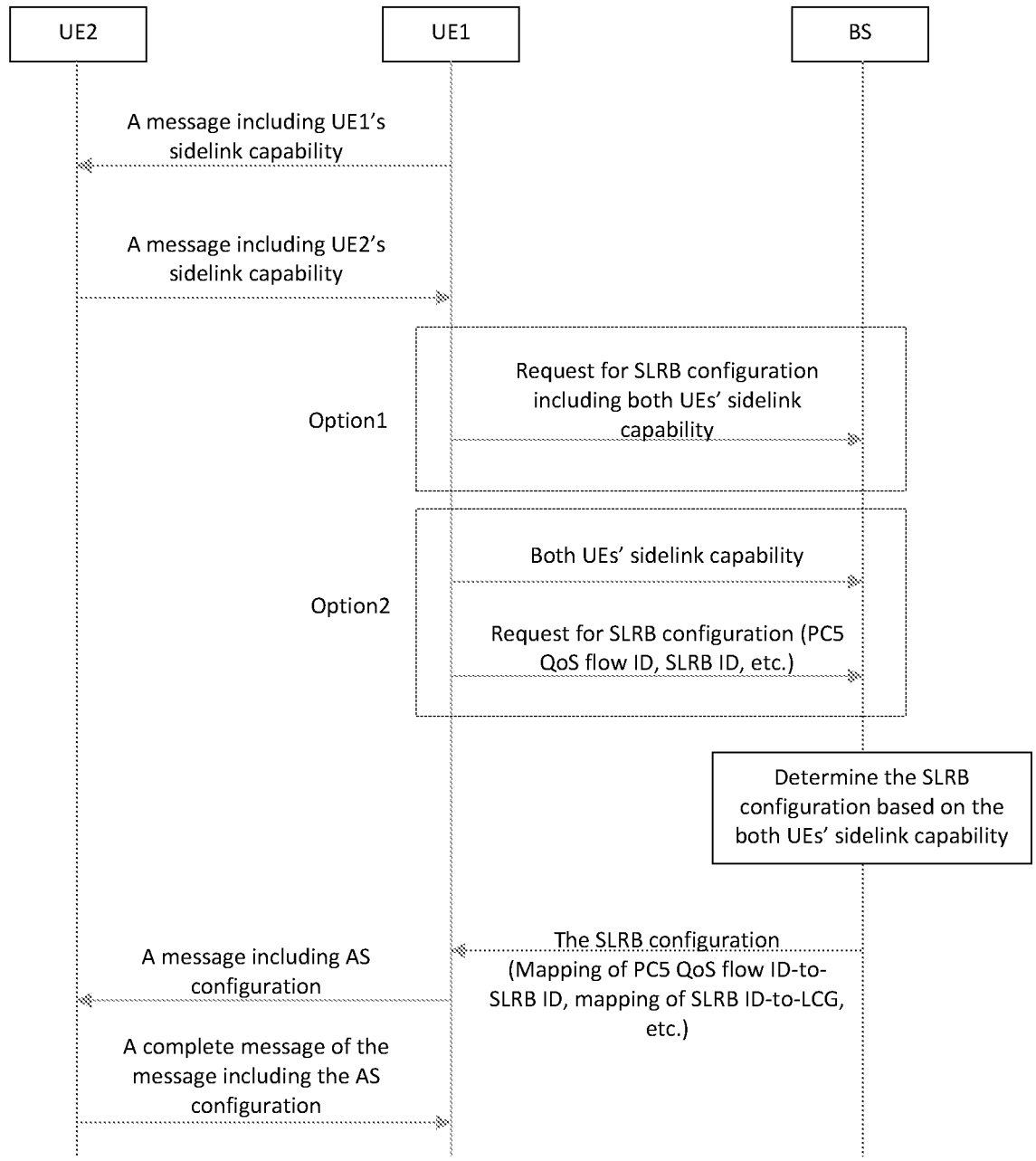
FIG. 13 is a flow chart according to one exemplary embodiment.

In one embodiment, the UE1 may report the UE sidelink capability information of both UEs in the message used to request a SLRB configuration for the unicast link or used to inform gNB that the UE1 is interested in sidelink communication. Possibly, the UE1 may report the UE sidelink capability information of both UEs in a UE assistance information to the gNB. In other words, UE capability transfer procedure should be done on both UEs before requesting NW-configured SLRB configuration. After receiving the NW-configured SLRB configuration from the gNB, the UE1 will transmit an AS configuration to the UE2. Since the AS configuration will be acceptable to the UE2, the UE2 will reply a complete message associated with the AS configuration to the UE1. The AS configuration includes parameters (or the SLRB configuration) used for transmission and/or reception on the unicast link. This solution could be illustrated in FIG. 13, which shows an exemplary flow chart for reporting UE sidelink capability information and requesting SLRB configuration according to one exemplary embodiment.

Regarding the UE sidelink capability information, at least one of following elements or parameters could be included:
Maximum bit number of a TB in a transmission time unit (e.g. one TTI);
Whether a certain MCS (e.g. 16 or 64 QAM) is supported;
Whether CBR measurement is supported;
TX diversity related;
Whether FR2 is supported;
Whether mode1/mode2 co-existence is supported;
Band combinations support simultaneous TX or RX;
Supported SLRB ID range;
Supported PC5 QoS flow ID range;
Supported PDCP related configuration (e.g. Discard timer, pdcp-SN-Size, maxCID, profiles, outOfOrderDelivery, t-Reordering and/or etc.);
Supported RLC related configuration. (e.g. logicalChannelIdentity, RLC Mode, sn-FieldLength, t-Reassembly, t-StatusProhibit, t-PollRetransmit, pollPDU, pollByte, maxRetxThreshold and/or etc.); and
Supported MAC related configuration (e.g. priority range, LCH restrictions, logicalChannelGroup, schedulingRequestID and/or etc.).

It is also possible that the UE sidelink capability information may contain parameters for transmission, parameters for reception, and/or parameters for both transmission and reception. In this situation, the UE may only need to report part of the UE sidelink capability to the gNB for the gNB to determine the SLRB configuration for single direction (i.e. for one UE to the other UE) e.g. parameters for transmission of the UE and parameters for reception of the peer UE.

Figure 16:
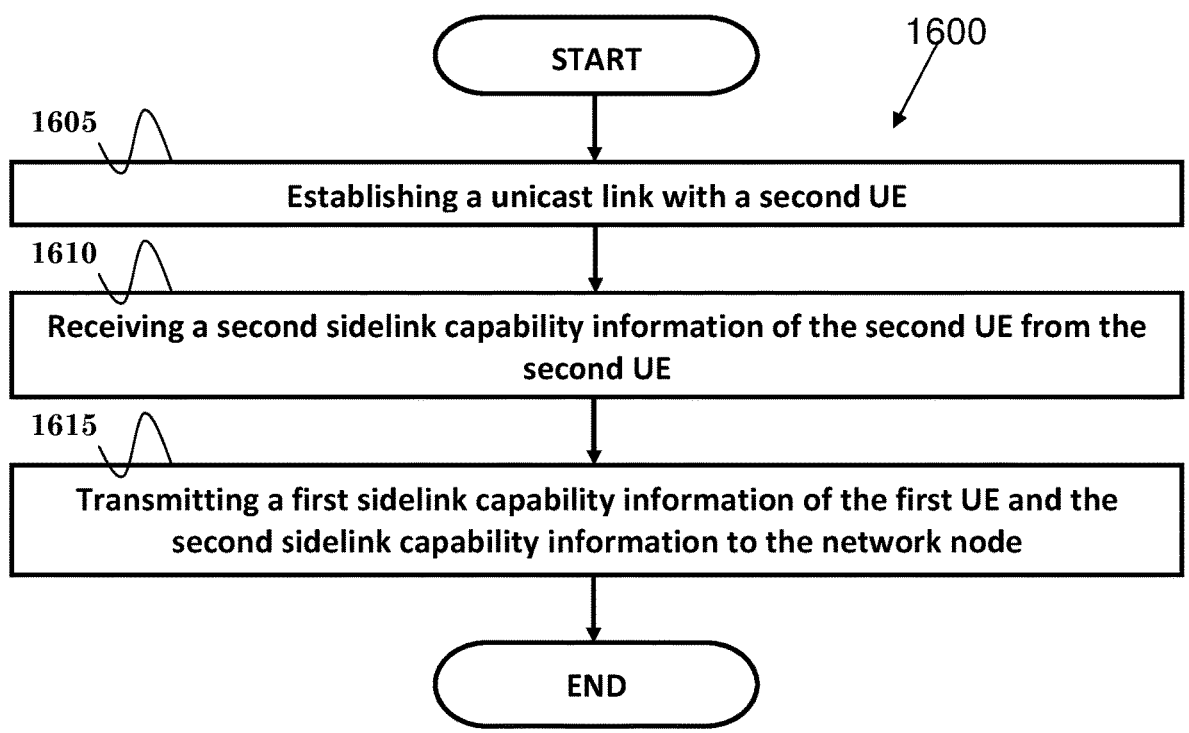
FIG. 16 is a flow chart according to one exemplary embodiment.

FIG. 16 is a flow chart 1600 according to one exemplary embodiment from the perspective of a first UE to report UE sidelink capability information to a network node. In step 1605, the first UE establishes a unicast link with a second UE. In step 1610, the UE receives a second sidelink capability information of the second UE from the second UE. In step 1615, the first UE transmits a first sidelink capability information of the first UE and the second sidelink capability information to the network node.

In one embodiment, the first UE could transmit the first sidelink capability information of the first UE to the second UE. The first UE could also transmit a first message to the network node to request a SLRB configuration for the unicast link. Furthermore, the first UE could receive a second message from the network node, wherein the second message includes the SLRB configuration for the unicast link.

Referring back to FIGS. 3 and 4, in one exemplary embodiment of a first UE, the device 300 includes a program code 312 stored in the memory 310. The CPU 308 could execute program code 312 to enable the first UE (i) to establish a unicast link with a second UE, (ii) to receive a second sidelink capability information of the second UE from the second UE, and (iii) to transmit a first sidelink capability information of the first UE and the second sidelink capability information to the network node. Furthermore, the CPU 308 can execute the program code 312 to perform all of the above-described actions and steps or others described herein.

Figure 17:
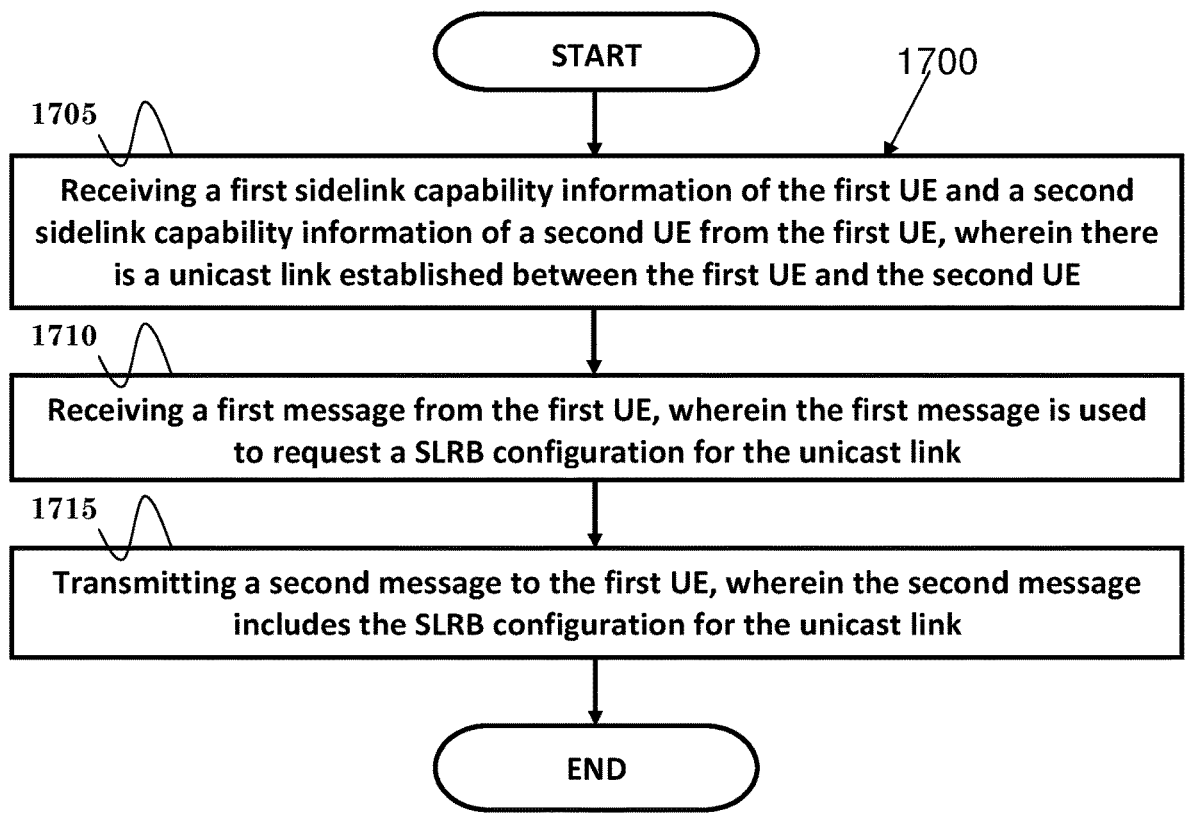
FIG. 17 is a flow chart according to one exemplary embodiment.

FIG. 17 is a flow chart 1700 according to one exemplary embodiment from the perspective of a network node to receive UE sidelink capability information from a first UE. In step 1705, the network node receives a first sidelink capability information of the first UE and a second sidelink capability information of a second UE from the first UE, wherein there is a unicast link established between the first UE and the second UE. In step 1710, the network node receives a first message from the first UE, wherein the first message is used to request a SLRB configuration for the unicast link. In step 1715, the network node transmits a second message to the first UE, wherein the second message includes the SLRB configuration for the unicast link.

Referring back to FIGS. 3 and 4, in one exemplary embodiment of a network node, the device 300 includes a program code 312 stored in the memory 310. The CPU 308 could execute program code 312 to enable the network node (i) to receive a first sidelink capability information of the first UE and a second sidelink capability information of a second UE from the first UE, wherein there is a unicast link established between the first UE and the second UE, (ii) to receive a first message from the first UE, wherein the first message is used to request a SLRB configuration for the unicast link, and (iii) to transmit a second message to the first UE, wherein the second message includes the SLRB configuration for the unicast link. Furthermore, the CPU 308 can execute the program code 312 to perform all of the above-described actions and steps or others described herein.

In the context of the embodiments illustrated in FIGS. 16 and 17 and described above, in one embodiment, the network node could include an identity of a PC5 QoS flow for the unicast link. The second message could include the identity of the PC5 QoS flow.

In one embodiment, the first message could include an identity of a SLRB for the unicast link. The second message could include an identity of a SLRB for the unicast link. The second message could indicate the PC5 QoS flow is mapped to the SLRB.

In one embodiment, the first sidelink capability information and the second sidelink capability information could be transmitted to the network node in one message or two messages. The first sidelink capability information and the second sidelink capability information could be included in the first message. The first sidelink capability information and the second sidelink capability information could also be included in an UE assistance information (e.g. UEAssistanceInformation) or an information used to indicate the first UE is interested in sidelink communication (e.g. SidelinkUEInformation).

In one embodiment, the SLRB configuration could be determined according to the first sidelink capability information and the second sidelink capability information. The network node could be a base station (e.g. eNB).

It is possible that a sidelink capability parameter of UE1 is different from the counterpart sidelink capability parameter of the UE2. In order to derive a SLRB configuration acceptable to both UEs, gNB may need to determine the SLRB configuration based on the parameter with a lower capability. In other words, if the sidelink capability parameter of the UE1 is better than the counterpart of the UE2, gNB should determine the SLRB configuration based on the sidelink capability parameter of the UE2.

Figure 14:
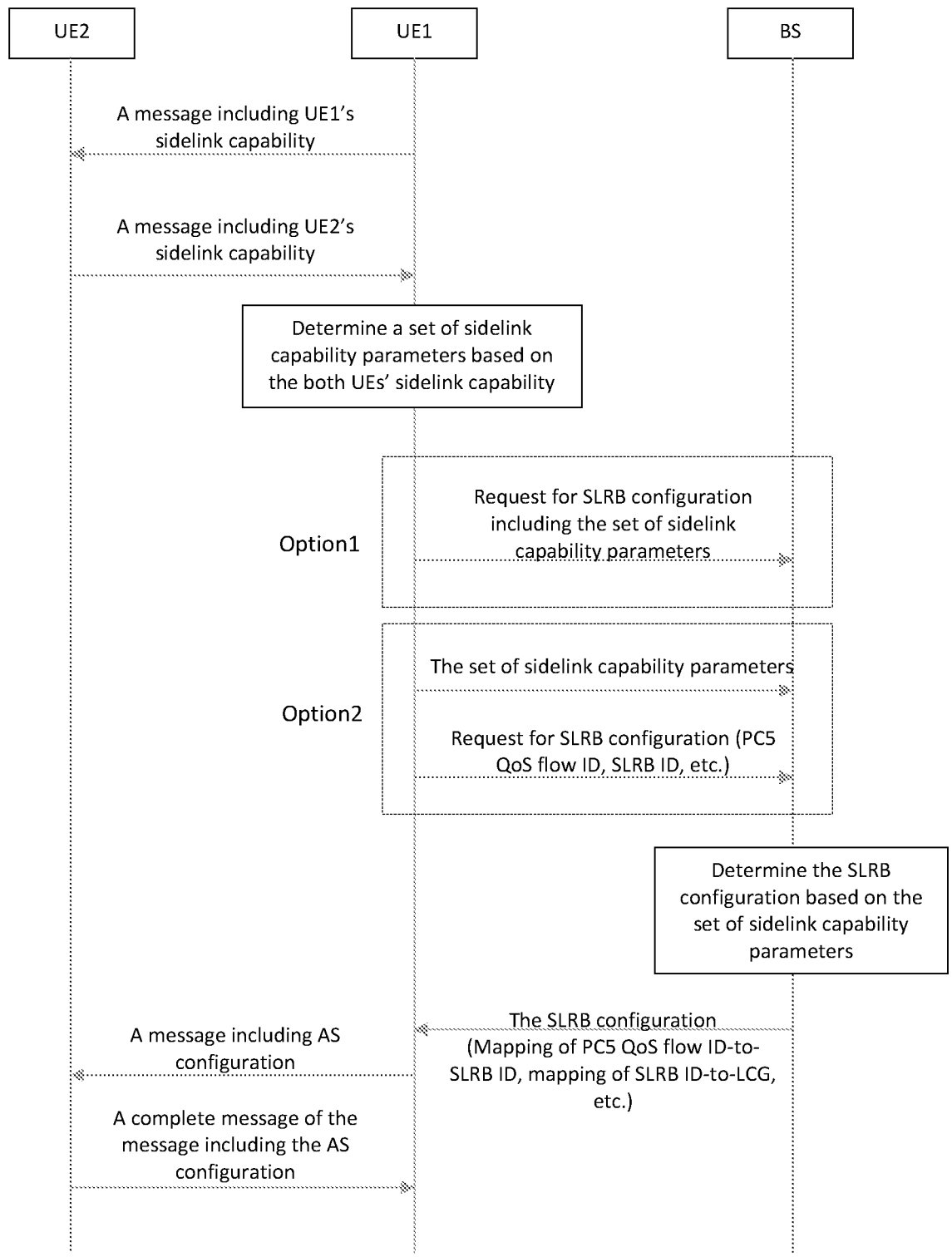
FIG. 14 is a flow chart according to one exemplary embodiment.

For example, UE1 may perform sidelink transmission to the UE2 on a unicast link. For maximum TB (Transport Block) size, UE1 can support up to 2,000 bits per TB, and UE2 can support up to 1,000 bits per TB. For MCS, UE1 can support it up to 64-QAM, and UE2 can support up to 16-QAM. It is feasible for UE1 to derive a set of sidelink capability parameters according to sidelink capabilities of both UEs. In this example, UE1 can report such as "1000 bits per TB for maximum TB size" and "16-QAM for MCS" to gNB. Instead of reporting UE sidelink capability information for both UEs, this alternative is that UE1 derives a set of sidelink capability parameters according to sidelink capabilities of both UEs and report this set of sidelink capability parameters to the gNB. Therefore, signalling overhead can be reduced. Similarly, UE1 may report the set of sidelink capability parameters derived from sidelink capabilities of both UEs in the message used to request SLRB configuration for the unicast link and/or used to inform gNB that UE1 is interested in sidelink communication. Possibly, the set of sidelink capability parameters derived from sidelink capabilities of both UEs could be included in a UE assistance information to be sent to the gNB. This alternative could be illustrated in FIG. 14, which shows an exemplary flow chart for reporting UE sidelink capability information and requesting SLRB configuration according to one exemplary embodiment.

Regarding the sidelink capability parameter, it could be one of following elements or parameters:
Maximum bit number of a TB in a transmission time unit (e.g. one TTI);
Whether a certain MCS (e.g. 16 or 64 QAM) is supported;
Whether CBR measurement is supported;
TX diversity related;
Whether FR2 is supported;
Whether mode1/mode2 co-existence is supported;
Band combinations support simultaneous TX or RX;
Supported SLRB ID range;
Supported PC5 QoS flow ID range;
Supported PDCP related configuration (e.g. Discard timer, pdcp-SN-Size, maxCID, profiles, outOfOrderDelivery, t-Reordering and/or etc.);
Supported RLC related configuration. (e.g. logicalChannelIdentity, RLC Mode, sn-FieldLength, t-Reassembly, t-StatusProhibit, t-PollRetransmit, pollPDU, pollByte, maxRetxThreshold and/or etc.); and
Supported MAC related configuration (e.g. priority range, LCH restrictions, logicalChannelGroup, schedulingRequestID and/or etc.).

Figure 18:
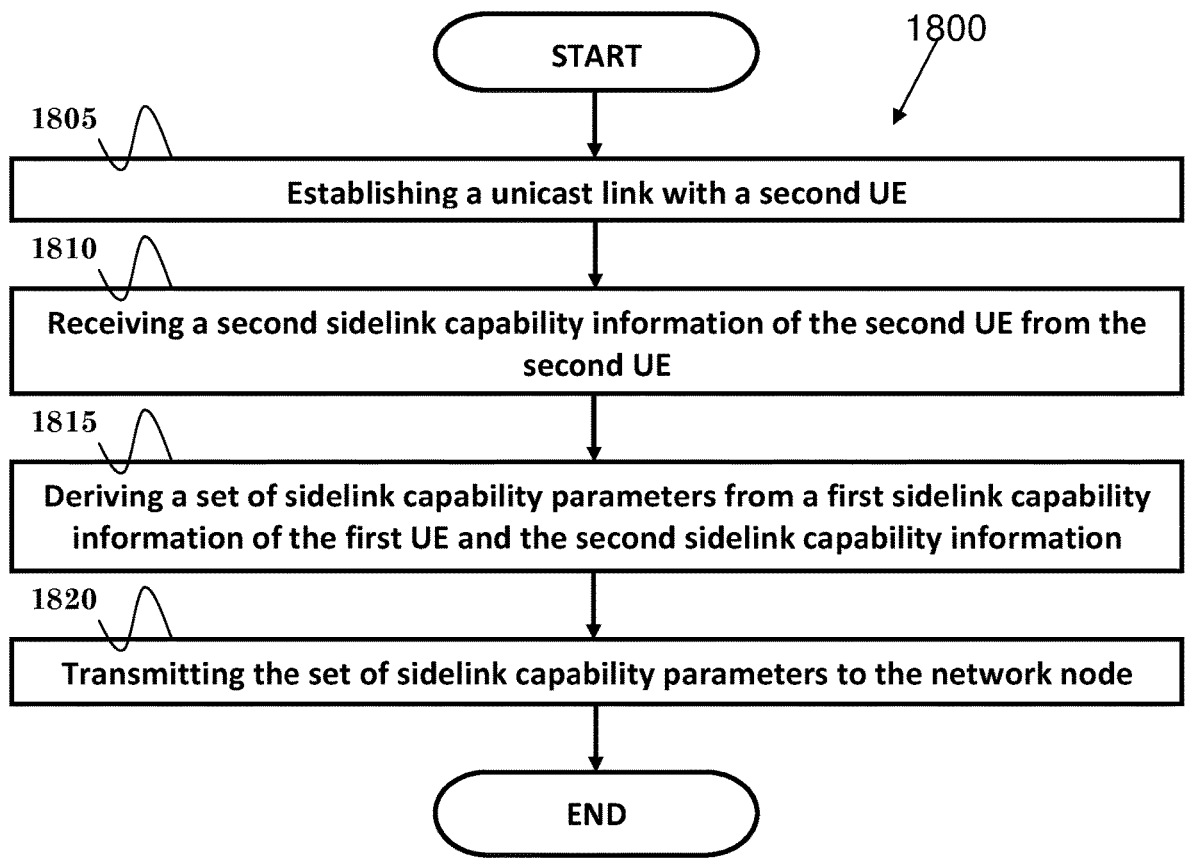
FIG. 18 is a flow chart according to one exemplary embodiment.

FIG. 18 is a flow chart 1800 according to one exemplary embodiment from the perspective of a first UE to report UE sidelink capability information to a network node. In step 1805, the first UE establishes a unicast link with a second UE. In step 1810, the UE receives a second sidelink capability information of the second UE from the second UE. In step 1815, the first UE derives a set of sidelink capability parameters from a first sidelink capability information of the first UE and the second sidelink capability information. In step 1820, the first UE transmits the set of sidelink capability parameters to the network node.

In one embodiment, the first UE could transmit the first sidelink capability information of the first UE to the second UE. The first UE could also transmit a first message to the network node to request a SLRB configuration for the unicast link. Furthermore, the first UE could receive a second message from the network node, wherein the second message includes the SLRB configuration for the unicast link.

Referring back to FIGS. 3 and 4, in one exemplary embodiment of a first UE, the device 300 includes a program code 312 stored in the memory 310. The CPU 308 could execute program code 312 to enable the first UE (i) to establish a unicast link with a second UE, (ii) to receive a second sidelink capability information of the second UE from the second UE, (iii) to derive a set of sidelink capability parameters from a first sidelink capability information of the first UE and the second sidelink capability information, and (iv) to transmit the set of sidelink capability parameters to the network node. Furthermore, the CPU 308 can execute the program code 312 to perform all of the above-described actions and steps or others described herein.

Figure 19:
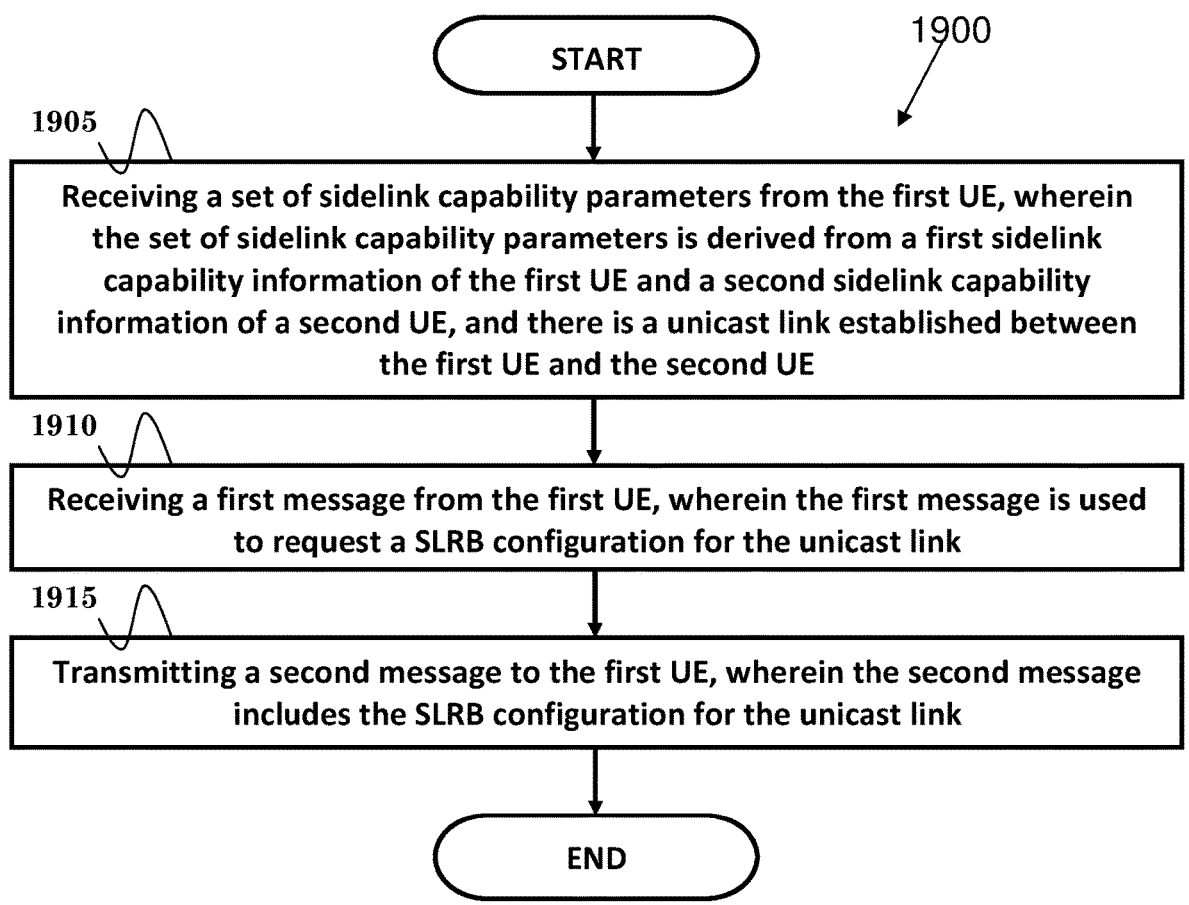
FIG. 19 is a flow chart according to one exemplary embodiment.

FIG. 19 is a flow chart 1900 according to one exemplary embodiment from the perspective of a network node to receive UE sidelink capability information from a first UE. In step 1905, the network node receives a set of sidelink capability parameters from the first UE, wherein the set of sidelink capability parameters is derived from a first sidelink capability information of the first UE and a second sidelink capability information of a second UE, and there is a unicast link established between the first UE and the second UE. In step 1910, the network node receives a first message from the first UE, wherein the first message is used to request a SLRB configuration for the unicast link. In step 1915, the network node transmits a second message to the first UE, wherein the second message includes the SLRB configuration for the unicast link.

Referring back to FIGS. 3 and 4, in one exemplary embodiment of a network node, the device 300 includes a program code 312 stored in the memory 310. The CPU 308 could execute program code 312 to enable the network node (i) to receive a set of sidelink capability parameters from the first UE, wherein the set of sidelink capability parameters is derived from a first sidelink capability information of the first UE and a second sidelink capability information of a second UE, and there is a unicast link established between the first UE and the second UE, (ii) to receive a first message from the first UE, wherein the first message is used to request a SLRB configuration for the unicast link, and (iii) to transmit a second message to the first UE, wherein the second message includes the SLRB configuration for the unicast link. Furthermore, the CPU 308 can execute the program code 312 to perform all of the above-described actions and steps or others described herein.

In the context of the embodiments illustrated in FIGS. 18 and 19 and described above, in one embodiment, the first message could include an identity of a PC5 QoS flow for the unicast link. The second message could include the identity of the PC5 QoS flow.

In one embodiment, the first message could include an identity of a SLRB for the unicast link. The second message could include an identity of a SLRB for the unicast link. The second message could indicate the PC5 QoS flow is mapped to the SLRB.

In one embodiment, the set of sidelink capability parameters could be transmitted to the network node in one message or two messages. The set of sidelink capability parameters could be included in the first message. Furthermore, the set of sidelink capability parameters could be included in an UE assistance information (e.g. UEAssistanceInformation) or an information used to indicate the first UE is interested in sidelink communication (e.g. SidelinkUEInformation).

In one embodiment, the SLRB configuration could be determined according to the set of sidelink capability parameters. The network node could be a base station (e.g. eNB).

Alternatively, UE1 may not include UE2's sidelink capability parameters in a request for SLRB configuration. Instead, UE1 may include UE2's sidelink capability parameters in a failure message of SLRB configuration sent to the base station if UE2 cannot comply with the SLRB configuration. Possibly, the base station could first determine the SLRB configuration based on UE1's sidelink capability parameters. And then, UE1 could transmit AS configuration to UE2 via PC5 RRC message where the AS configuration could be derived from the SLRB configuration. If UE2's sidelink capability and UE1's sidelink capability are different, UE2 may not be able to comply with the AS configuration. In this situation, UE2 may transmit a failure message of the AS configuration to UE1. The failure message could be a RRC message (e.g. RRCReconfigurationFailureSidelink). The failure message could include a cause value that indicates UE2 cannot comply with the AS configuration due to e.g. sidelink capability.

Upon reception of the failure message due to sidelink capability, UE1 could transmit a failure indication to the base station. The failure incitation could be transmitted via a RRC message e.g. SidelinkUEInformationNR. The failure indication could be a cause value that indicates UE2 cannot comply with the AS configuration or the SLRB configuration. Furthermore, the RRC message including the failure indication could include UE2's sidelink capability parameters. Alternatively, the RRC message may include UE2's sidelink capability parameters instead of the failure indication so as to imply UE2 cannot comply with the AS configuration and reduce signalling overhead. In addition to the failure indication and/or UE2's sidelink capability parameters, the RRC message may also include e.g. SL-DestinationIdentity or sl-DestinationIndex associated with the concerned SLRB, SLRB-Uu-ConfigIndex associated with the concerned SLRB, sl-QoS-FlowIdentity of PC5 QoS flow(s) mapped to the concerned SLRB, and/or sl-QoS-Profile of the PC5 QoS flow(s).

Figure 15:
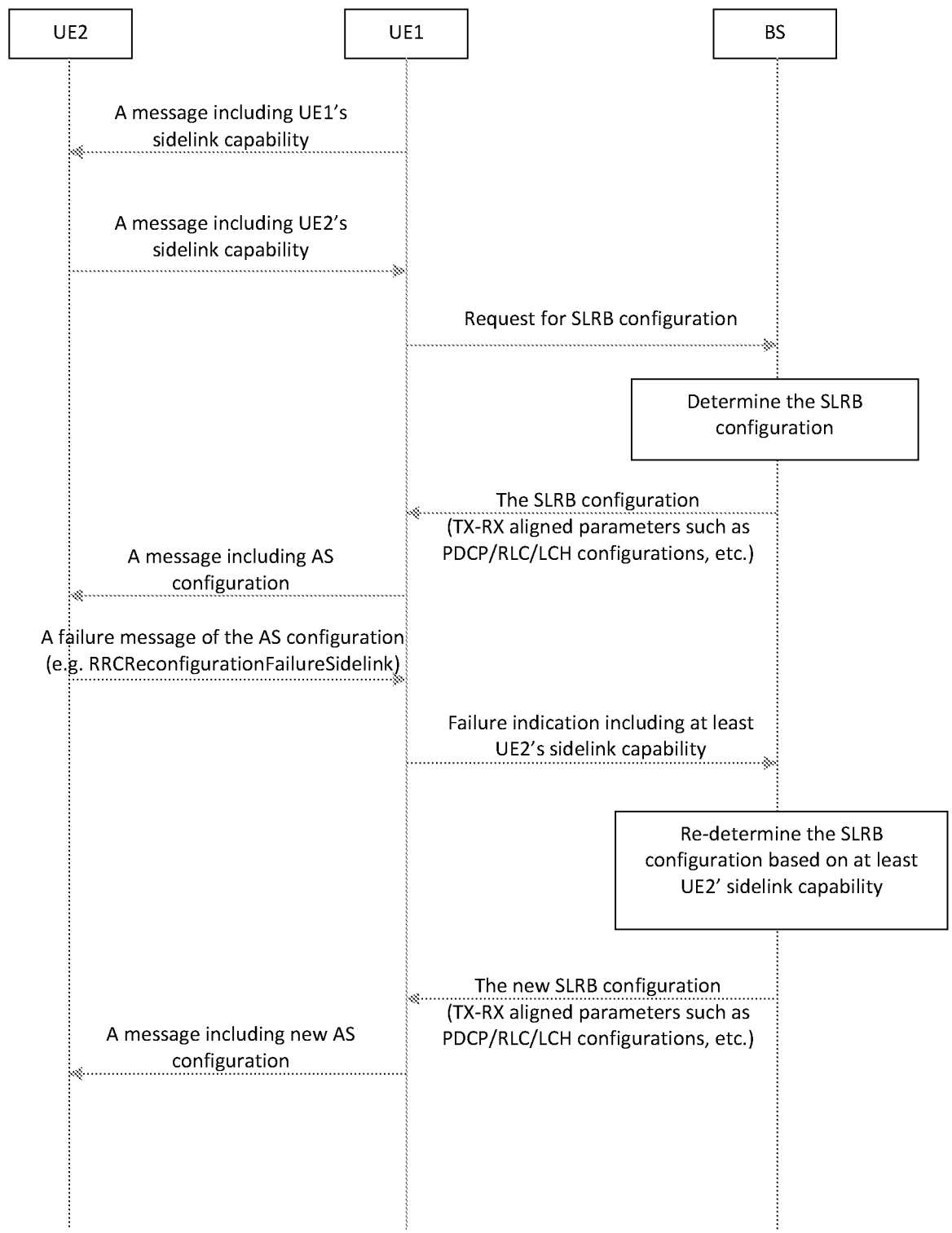
FIG. 15 is a flow chart according to one exemplary embodiment.

Upon reception of the RRC message including UE2's sidelink capability parameters, the base station could reconsider or re-determine a new SLRB configuration for the concerned SLRB based on UE1's sidelink capability parameters and/or UE2's sidelink capability parameters, and provide the new SLRB configuration to UE1. With the new SLRB configuration, UE1 transmits a new AS configuration to UE2 via PC5 RRC message. The alternative could be illustrated in FIG. 15, which is an exemplary flow chart for reporting UE sidelink capability information upon reception of RRCReconfigurationFailureSidelink according to one exemplary embodiment.

According to 3GPP [108#44][V2X] 38.331/36.331 Running CRs-Part1 38.331 CR (Huawei), UE transmits sl-Failure to the base station via SidelinkUEInformationNR when sidelink RLF is detected. In this case, the base station may not need to re-consider or re-determine a new SLRB configuration. Therefore, upon detection of SL RLF, UE1 could transmit a failure indication indicating SL RLF to the base station via a RRC message (e.g. SidelinkUEInformationNR). However, the RRC message may not need to include UE2's sidelink capability parameters.

In addition, according to the 3GPP RAN2#108 Chairman's note, if a UE is able to comply with the received configuration in AS-layer configuration message, the UE initiates PC5-RRC based AS-layer Configuration Complete. Otherwise, the UE initiates PC5-RRC based AS-layer configuration failure. Based on this agreement, the failure message could include a cause value that indicates LCID collision in the AS configuration. Since the LCID corresponding to a sidelink logical channel of the AS configuration is assigned by UE1, UE1 could re-assign a new LCID for the sidelink logical channel in response to reception of the failure message indicating LCID collision, and could transmit a new AS configuration with the new LCID (i.e. all TX-RX aligned parameters other than LCID are not changed) for configuring the sidelink logical channel to UE2. In this case, the base station may not need to re-consider or re-determine a new SLRB configuration. Therefore, upon reception of a failure message indicating LCID collision, UE1 may not need to transmit a failure indication indicating LCID collision to the base station via a RRC message (e.g. SidelinkUEInformationNR).

Figure 20:
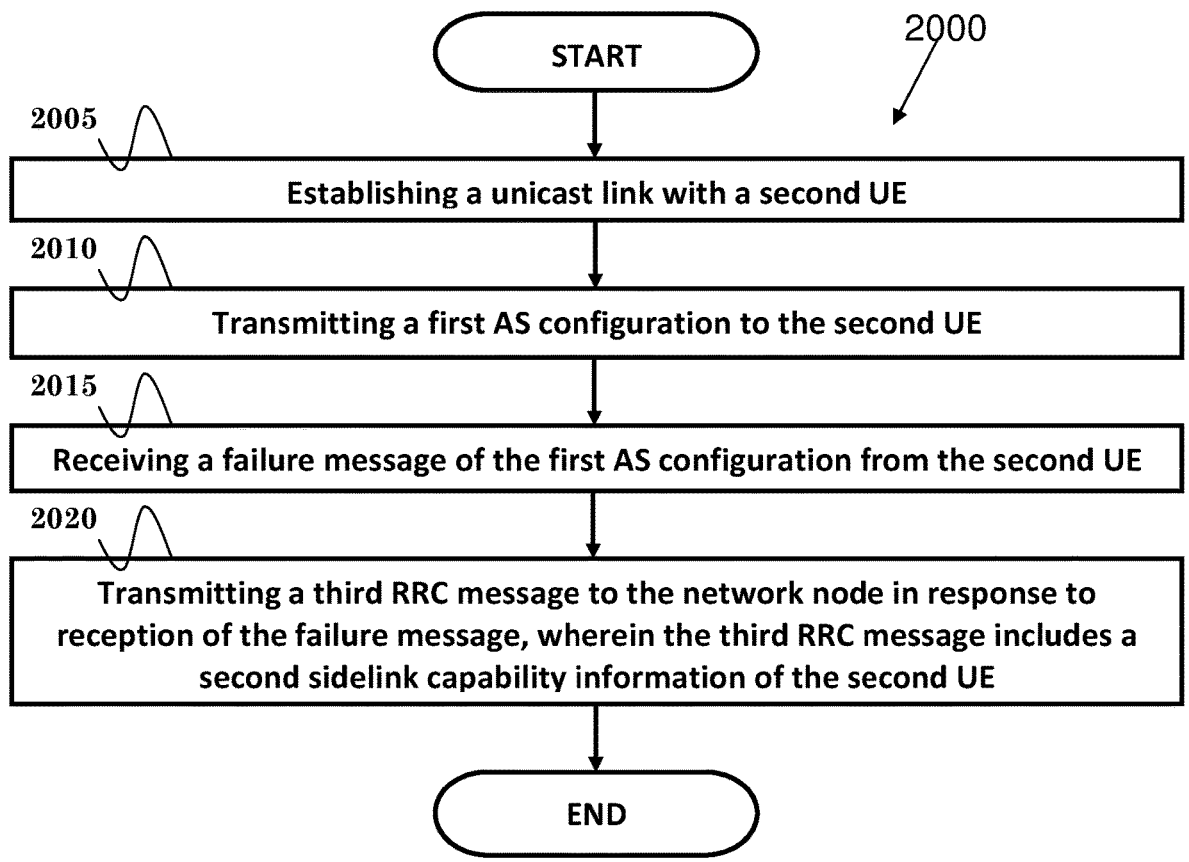
FIG. 20 is a flow chart according to one exemplary embodiment.

FIG. 20 is a flow chart 2000 according to one exemplary embodiment from the perspective of a first UE to request SLRB configuration from a network node. In step 2005, the first UE establishes a unicast link with a second UE. In step 2010, the first UE transmits a first AS configuration to the second UE. In step 2015, the first UE receives a failure message of the first AS configuration from the second UE. In step 2020, the first UE transmits a third RRC message to the network node in response to reception of the failure message, wherein the third RRC message includes a second sidelink capability information of the second UE.

In one embodiment, the first UE could receive the second sidelink capability information of the second UE via PC5 RRC message. The first UE could also transmit a first RRC message to the network node for requesting a first SLRB configuration for the unicast link, wherein the first AS configuration is derived from the first SLRB configuration. Furthermore, the first UE could receive a second RRC message from the network node, wherein the second RRC message includes the first SLRB configuration for the unicast link.

In one embodiment, the first UE could receive a fourth RRC message from the network node, wherein the fourth RRC message includes a second SLRB configuration for the unicast link. The UE could also transmit a second AS configuration to the second UE via PC5 RRC message, wherein the second AS configuration is derived from the second SLRB configuration.

Referring back to FIGS. 3 and 4, in one exemplary embodiment of a first UE, the device 300 includes a program code 312 stored in the memory 310. The CPU 308 could execute program code 312 to enable the first UE (i) to establish a unicast link with a second UE, (ii) to transmit a first AS configuration to the second UE, (iii) to receive a failure message of the first AS configuration from the second UE, and (iv) to transmit a third RRC message to the network node in response to reception of the failure message, wherein the third RRC message includes a second sidelink capability information of the second UE. Furthermore, the CPU 308 can execute the program code 312 to perform all of the above-described actions and steps or others described herein.

Figure 21:
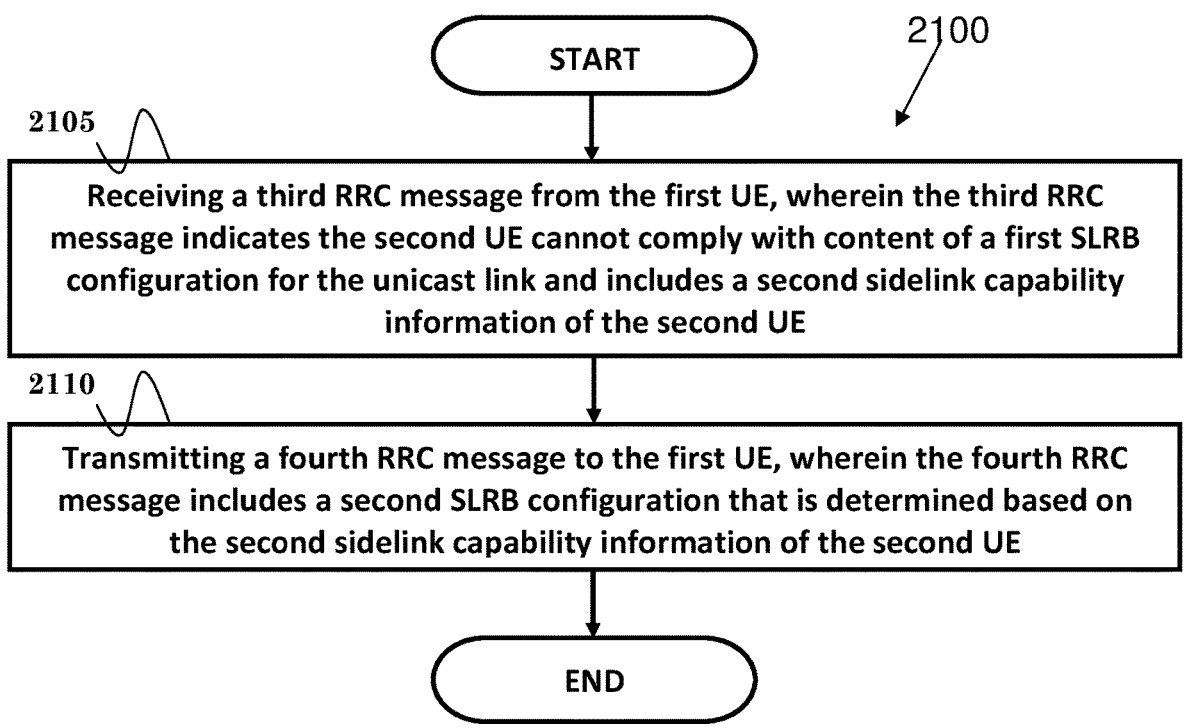
FIG. 21 is a flow chart according to one exemplary embodiment.

FIG. 21 is a flow chart 2100 according to one exemplary embodiment from the perspective of a network node to provide SLRB configuration for a unicast link established between a first UE and a second UE. In step 2105, the network node receives a third RRC message from the first UE, wherein the third RRC message indicates the second UE cannot comply with content of a first SLRB configuration for the unicast link and includes a second sidelink capability information of the second UE. In step 2110, the network node transmits a fourth RRC message to the first UE, wherein the fourth RRC message includes a second SLRB configuration that is determined based on the second sidelink capability information of the second UE.

In one embodiment, the network node could receive a first RRC message from the first UE for requesting the first SLRB configuration for the unicast link. The network node could also transmit the second RRC message to the first UE, wherein the second RRC message includes the first SLRB configuration for the unicast link.

Referring back to FIGS. 3 and 4, in one exemplary embodiment of a network node, the device 300 includes a program code 312 stored in the memory 310. The CPU 308 could execute program code 312 to enable the network node (i) to receive a third RRC message from the first UE, wherein the third RRC message indicates the second UE cannot comply with content of a first SLRB configuration for the unicast link and includes a second sidelink capability information of the second UE, and (ii) to transmit a fourth RRC message to the first UE, wherein the fourth RRC message includes a second SLRB configuration that is determined based on the second sidelink capability information of the second UE. Furthermore, the CPU 308 can execute the program code 312 to perform all of the above-described actions and steps or others described herein.

In the context of the embodiments illustrated in FIGS. 20 and 21 and described above, in one embodiment, the first RRC message could include a first sidelink capability information of the first UE. The third RRC message could also include a first sidelink capability information of the first UE.

In one embodiment, the first message could include an identity of a PC5 QoS flow for the unicast link (e.g. sl-QoS-FlowIdentity), a PC5 QoS profile of the PC5 QoS flow for the unicast link (e.g. sl-QoS-Profile), or a destination Layer-2 ID of the second UE (e.g. SL-DestinationIdentity). The second message could include the identity of the PC5 QoS flow (e.g. sl-QoS-FlowIdentity), or an identity or a configuration index of a SLRB for the unicast link (e.g. SLRB-Uu-ConfigIndex). The second message could indicate that the PC5 QoS flow is mapped to the SLRB.

In one embodiment, the first SLRB configuration could include a first set of TX-RX aligned parameters associated with the SLRB. The third message could include SL-DestinationIdentity or sl-DestinationIndex associated with the SLRB, SLRB-Uu-ConfigIndex associated with the SLRB, sl-QoS-FlowIdentity of the PC5 QoS flow mapped to the SLRB, and/or sl-QoS-Profile of the PC5 QoS flow. The SL-DestinationIdentity or the sl-DestinationIndex may be associated with the second UE. The fourth message could include a second set of TX-RX aligned parameters associated with the SLRB.

In one embodiment, the first message or the third message could be a SidelinkUEInformationNR. The second message or the third message could be a RRCReconfiguration. The first or second sidelink capability information could include, for example, supported TX-RX aligned parameters, SLRB ID range, logical channel identity (LCID) range, PC5 QoS flow ID range, Maximum bit number of a TB in a transmission time unit, and/or MCS. The network node could be a base station (e.g. eNB).

Figure 22:
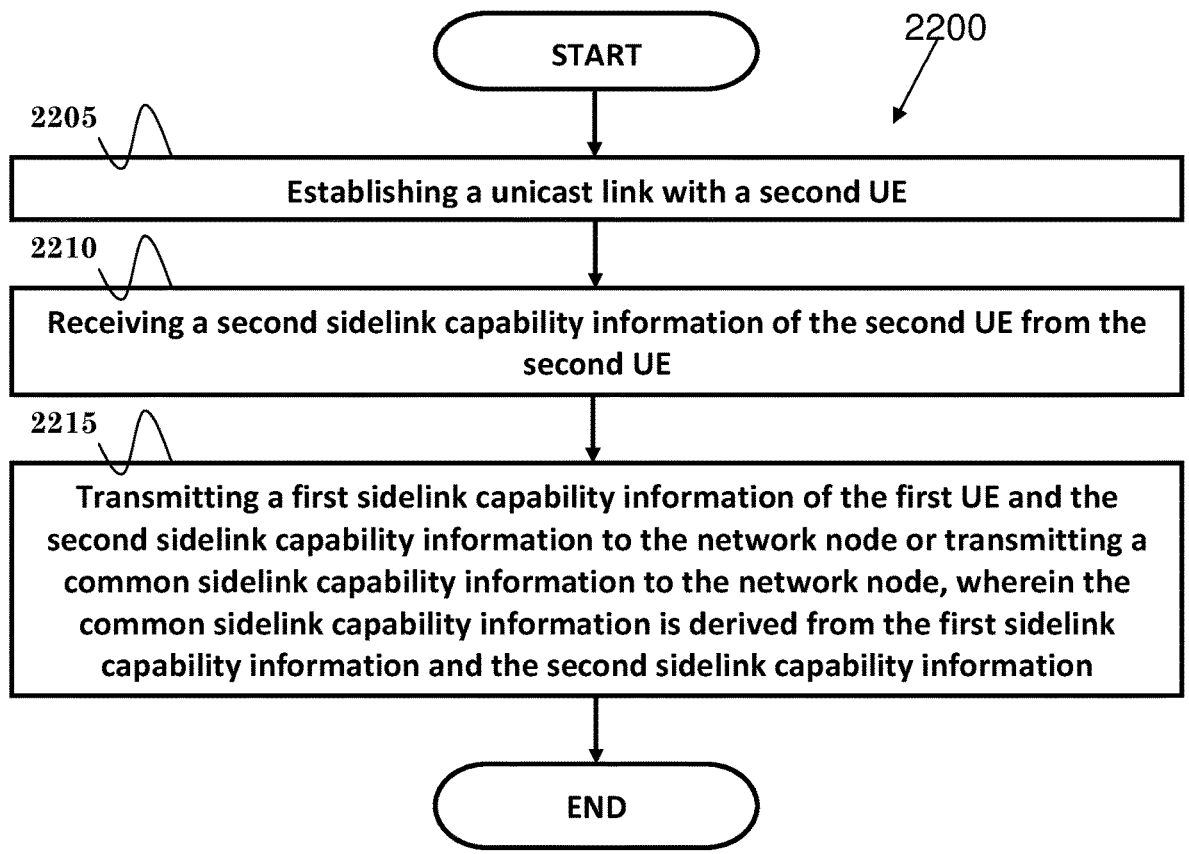
FIG. 22 is a flow chart according to one exemplary embodiment.

FIG. 22 is a flow chart 2200 according to one exemplary embodiment from the perspective of a first UE to report UE sidelink capability information to a network node. In step 2205, the first UE establishes a unicast link with a second UE. In step 2210, the first UE receives a second sidelink capability information of the second UE from the second UE. In step 2215, the first UE transmits a first sidelink capability information of the first UE and the second sidelink capability information to the network node or transmits a common sidelink capability information to the network node, wherein the common sidelink capability information is derived from the first sidelink capability information and the second sidelink capability information.

In one embodiment, the first UE could transmit a first message to the network node to request a SLRB configuration for the unicast link. The first UE could also receive a second message from the network node, wherein the second message includes a SLRB (Sidelink Radio Bearer) configuration for the unicast link.

In one embodiment, the first sidelink capability information and the second sidelink capability information could be included in one message or in two messages respectively. In one embodiment, the first or second sidelink capability information or the common sidelink capability information could also be included in a UE assistance information (e.g. UEAssistanceInformation) or a sidelink UE information (e.g. SidelinkUEInformation). The first or second message could be a RRC message.

In one embodiment, the network node could be a base station (e.g. gNB).

Referring back to FIGS. 3 and 4, in one exemplary embodiment of a first UE, the device 300 includes a program code 312 stored in the memory 310. The CPU 308 could execute program code 312 to enable the first UE (i) to establish a unicast link with a second UE, (ii) to receive a second sidelink capability information of the second UE from the second UE, and (iii) to transmit a first sidelink capability information of the first UE and the second sidelink capability information to a network node or transmit a common sidelink capability information to the network node, wherein the common sidelink capability information is derived from the first sidelink capability information and the second sidelink capability information. Furthermore, the CPU 308 can execute the program code 312 to perform all of the above-described actions and steps or others described herein.

Figure 23:
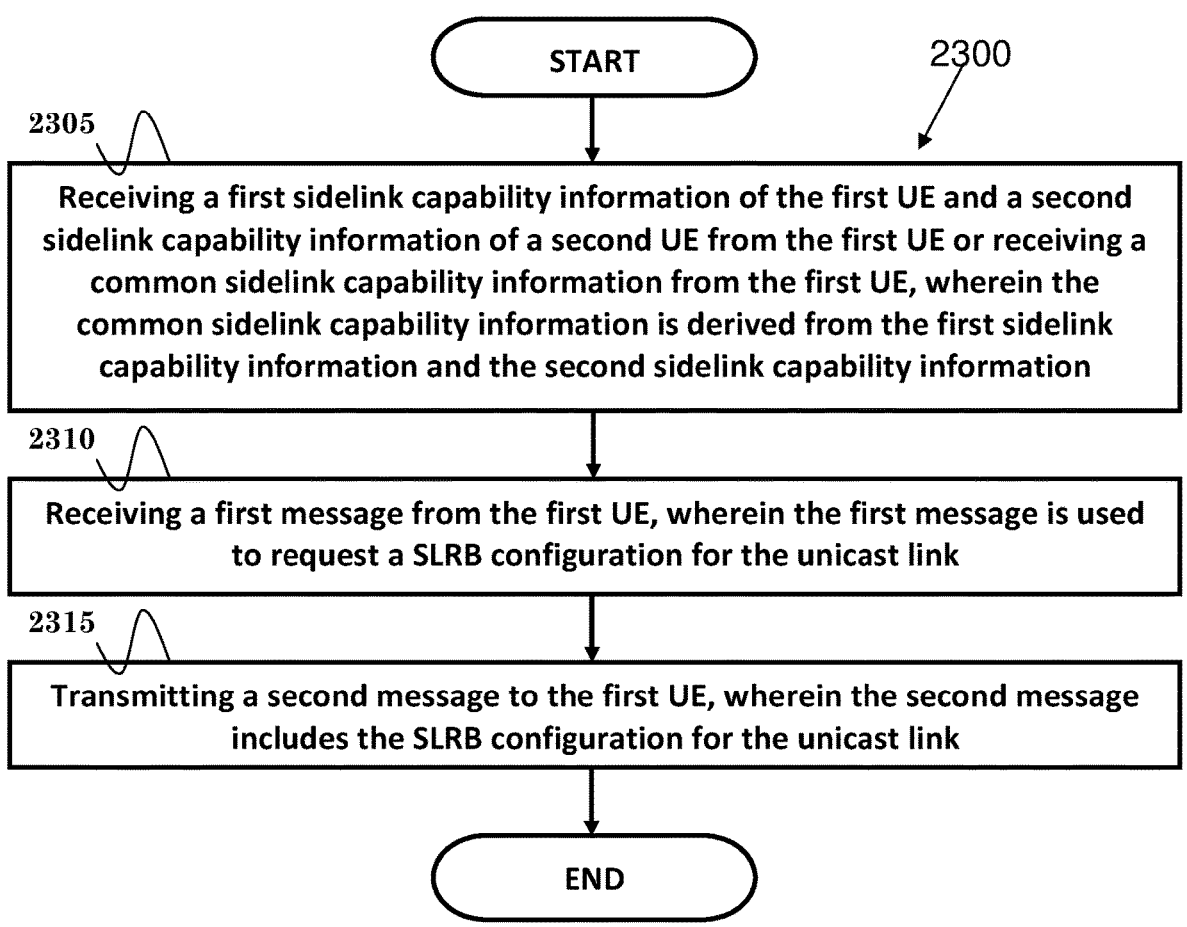
FIG. 23 is a flow chart according to one exemplary embodiment.

FIG. 23 is a flow chart 2300 according to one exemplary embodiment from the perspective of a network node to receive UE sidelink capability information from a first UE, wherein there is a unicast link established between the first UE and a second UE. In step 2305, the network node receives a first sidelink capability information of the first UE and a second sidelink capability information of a second UE from the first UE or receives a common sidelink capability information from the first UE, wherein the common sidelink capability information is derived from the first sidelink capability information and the second sidelink capability information. In step 2310, the network node receives a first message from the first UE, wherein the first message is used to request a SLRB configuration for the unicast link. In step 2315, the network node transmits a second message to the first UE, wherein the second message includes the SLRB configuration for the unicast link.

In one embodiment, the SLRB configuration could be determined according to the first sidelink capability information and the second sidelink capability information or according to the common sidelink capability information. The first message could include an identity of a PC5 QoS flow for the unicast link. The second message could include the identity of the PC5 QoS flow or an identity of a SLRB for the unicast link.

In one embodiment, the second message could indicate the PC5 QoS flow is mapped to the SLRB. The first sidelink capability information and the second sidelink capability information could be included in one message or in two messages respectively. The first or second sidelink capability information or the common sidelink capability information could also be included in an UE assistance information (e.g. UEAssistanceInformation) or a sidelink UE information (e.g. SidelinkUEInformation). The first or second message could be a RRC message.

In one embodiment, the network node could be a base station (e.g. gNB).

Referring back to FIGS. 3 and 4, in one exemplary embodiment of a network node, the device 300 includes a program code 312 stored in the memory 310. The CPU 308 could execute program code 312 to enable the network node (i) to receive a first sidelink capability information of the first UE and a second sidelink capability information of a second UE from the first UE or receive a common sidelink capability information from the first UE, wherein the common sidelink capability information is derived from the first sidelink capability information and the second sidelink capability information, (ii) to receive a first message from the first UE, wherein the first message is used to request a SLRB configuration for the unicast link, and (iii) to transmit a second message to the first UE, wherein the second message includes the SLRB configuration for the unicast link. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) to report UE sidelink capability information to a network node, comprising:
   establishing a unicast link with a second UE;
   transmitting a first sidelink capability information of the first UE to the second UE over the unicast link established with the second UE after the unicast link has been established, wherein the first sidelink capability information includes a first parameter of a first Radio Link Control (RLC) configuration supported by the first UE;
   receiving a second sidelink capability information of the second UE from the second UE over the unicast link established with the second UE after the unicast link has been established, wherein the second sidelink capability information includes a second parameter of a second RLC configuration supported by the second UE;
   transmitting the first sidelink capability information including the first parameter of the first RLC configuration supported by the first UE and the second sidelink capability information including the second parameter of the second RLC configuration supported by the second UE to the network node;
   receiving a second message from the network node, wherein the second message includes a SLRB (Sidelink Radio Bearer) configuration used for sidelink communication with the second UE and the SLRB configuration includes RLC parameters used on a SLRB; and
   transmitting an Access Stratum (AS) configuration including the RLC parameters used on the SLRB to the second UE and establishing the SLRB for sidelink transmission from the first UE to the second UE based on the RLC parameters used on the SLRB.

2. The method of claim 1, further comprising:
   transmitting a first message to the network node to request the SLRB configuration for the unicast link.

3. The method of claim 1, wherein the first sidelink capability information and the second sidelink capability information are included in one message or in two messages respectively.

4. The method of claim 1, wherein the second sidelink capability information is included in a UE assistance information or a sidelink UE information.

5. The method of claim 1, wherein the network node is a base station.

6. The method of claim 1, wherein the first parameter of the first RLC configuration supported by the first UE is a first RLC sequence number (SN) field size supported by the first UE, and the second parameter of the second RLC configuration supported by the second UE is a second RLC SN field size supported by the second UE.

7. A method for a network node to receive UE (User Equipment) sidelink capability information from a first UE, wherein there is a unicast link established between the first UE and a second UE, comprising:
   receiving a first sidelink capability information of the first UE and a second sidelink capability information of the second UE from the first UE after the unicast link has been established, wherein the first sidelink capability information includes a first parameter of a first Radio Link Control (RLC) configuration supported by the first UE and the second sidelink capability information includes a second parameter of a second RLC configuration supported by the second UE;
   receiving a first message from the first UE after the unicast link has been established, wherein the first message is used to request a SLRB (Sidelink Radio Bearer) configuration for the unicast link; and
   transmitting a second message to the first UE after the unicast link has been established, wherein the second message includes the SLRB configuration used for sidelink communication with the second UE and the SLRB configuration includes RLC parameters used on a SLRB.

8. The method of claim 7, wherein the SLRB configuration is determined according to the first sidelink capability information and the second sidelink capability information.

9. The method of claim 7, wherein the first message includes an identity of a PC5 QoS (Quality of Service) flow for the unicast link.

10. The method of claim 9, wherein the second message includes the identity of the PC5 QoS flow.

11. The method of claim 7, wherein the second message includes an identity of a SLRB for the unicast link.

12. The method of claim 7, wherein the second message indicates a PC5 QoS (Quality of Service) flow is mapped to a SLRB.

13. The method of claim 7, wherein the first sidelink capability information and the second sidelink capability information are included in one message or in two messages respectively.

14. The method of claim 7, wherein the second sidelink capability information is included in a UE assistance information or a sidelink UE information.

15. The method of claim 7, wherein the network node is a base station.

16. A first UE (User Equipment) to report UE sidelink capability information to a network node, comprising:
   a control circuit;
   a processor installed in the control circuit; and
   a memory installed in the control circuit and operatively coupled to the processor;
   wherein the processor is configured to execute a program code stored in the memory to:
     establish a unicast link with a second UE;
     transmit a first sidelink capability information of the first UE to the second UE over the unicast link established with the second UE after the unicast link has been established, wherein the first sidelink capability information includes a first parameter of a first Radio Link Control (RLC) configuration supported by the first UE;
     receive a second sidelink capability information of the second UE from the second UE over the unicast link established with the second UE after the unicast link has been established, wherein the second sidelink capability information includes a second parameter of a second RLC configuration supported by the second UE;

transmit the first sidelink capability information including the first parameter of the first RLC configuration supported by the first UE and the second sidelink capability information including the second parameter of the second RLC configuration supported by the second UE to the network node;

receive a second message from the network node, wherein the second message includes a SLRB (Sidelink Radio Bearer) configuration used for sidelink communication with the second UE and the SLRB configuration includes RLC parameters used on a SLRB; and transmit an Access Stratum (AS) configuration including the RLC parameters used on the SLRB to the second UE and establishing the SLRB for sidelink transmission from the first UE to the second UE based on the RLC parameters used on the SLRB.

17. The first UE of claim 16, wherein the processor is configured to execute a program code stored in the memory to:

transmit a first message to the network node to request the SLRB configuration for the unicast link.

18. The first UE of claim 16, wherein the first sidelink capability information and the second sidelink capability information are included in one message or in two messages respectively.

19. The first UE of claim 16, wherein the second sidelink capability information is included in a UE assistance information or a sidelink UE information.

* * * * *